US012802123B2

(12) United States Patent
Minsley et al.

(10) Patent No.: US 12,802,123 B2
(45) Date of Patent: *Nov. 17, 2026

(54) SYSTEM AND METHOD FOR TRANSMITTING UNLOCK CODES BASED ON EVENT TRIGGERS

(71) Applicant: DAVINCI LOCK LLC, Raleigh, NC (US)

(72) Inventors: Bradford Minsley, Raleigh, NC (US); Clifton Minsley, Raleigh, NC (US)

(73) Assignee: DAVINCI LOCK LLC, Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/745,403

(22) Filed: Jun. 17, 2024

(65) Prior Publication Data

US 2024/0338756 A1 Oct. 10, 2024

Related U.S. Application Data

(63) Continuation of application No. 18/196,007, filed on May 11, 2023, now Pat. No. 12,014,294, which is a (Continued)

(51) Int. Cl.

*G06Q 30/0601* (2023.01)
*E05B 65/48* (2006.01)

(Continued)

(52) U.S. Cl.

CPC ......... *G06Q 30/0645* (2013.01); *E05B 65/48* (2013.01); *G06Q 20/127* (2013.01);

(Continued)

(58) Field of Classification Search

CPC ............. G06Q 30/0645; G06Q 20/127; G06Q 2009/00396; G07C 9/27; G07C 8/21; E05B 65/48; H04L 67/025

(Continued)

(56) References Cited

U.S. PATENT DOCUMENTS 5,964,110 A * 10/1999 Crocco .................. E05B 9/086 70/369
7,047,773 B1 * 5/2006 Lin ...................... E05B 37/025 70/330

(Continued)

OTHER PUBLICATIONS

U.S. Patent and Trademark Office, Office Action, U.S. Appl. No. 19/089,408, filed May 2, 2025.

*Primary Examiner* — Zhen Y Wu

(74) *Attorney, Agent, or Firm* — Williams Mullen; Thomas F. Bergert

(57) ABSTRACT

The disclosure generally relates to a system and method for randomly generating unlock codes and identifiers for locks and creating unlock code and identifier pairs. In an exemplary embodiment, the invention is integrated with, or part of, a distributed management system that controls access to various locations, such as, for example, self-storage units, hotel rooms, apartment buildings, storage containers, short-term housing rentals, lockers, equipment rooms, vaults, hospitals, airports, government facilities, nuclear power facilities, water treatment facilities, weapon storage facilities, aircraft cockpits, and any other setting that requires restricted, selective, or monitored access that can be remotely, controlled, whereby users can receive unlock codes electronically on their mobile device.

2 Claims, 27 Drawing Sheets

Related U.S. Application Data continuation of application No. 17/963,296, filed on Oct. 11, 2022, now Pat. No. 11,663,650, which is a continuation-in-part of application No. 17/861,731, filed on Jul. 11, 2022, now Pat. No. 11,538,098, which is a continuation-in-part of application No. 17/547,289, filed on Dec. 10, 2021, now Pat. No. 11,416,919, which is a continuation-in-part of application No. 17/151,609, filed on Jan. 18, 2021, now Pat. No. 11,232,513, which is a continuation of application No. 16/545,247, filed on Aug. 20, 2019, now Pat. No. 10,922,747, which is a continuation-in-part of application No. 15/962,583, filed on Apr. 25, 2018, now Pat. No. 10,475,115, which is a continuation-in-part of application No. 15/914,179, filed on Mar. 7, 2018, now Pat. No. 10,614,650.

(60) Provisional application No. 62/722,379, filed on Aug. 24, 2018, provisional application No. 62/560,900, filed on Sep. 20, 2017.

(51) Int. Cl.

*G06Q 20/12* (2012.01)
*G06Q 30/0645* (2023.01)
*G07C 9/21* (2020.01)
*G07C 9/27* (2020.01)
*H04L 67/025* (2022.01)
*G07C 9/00* (2020.01)

(52) U.S. Cl.

CPC ................. *G07C 9/21* (2020.01); *G07C 9/27* (2020.01); *H04L 67/025* (2013.01); *G07C 2009/00396* (2013.01)

(58) Field of Classification Search

USPC .......................................................... 705/307
See application file for complete search history.

(56) References Cited

U.S. PATENT DOCUMENTS 7,236,085 B1 * 6/2007 Aronson ................... E05G 1/00 109/46
7,731,088 B2 * 6/2010 Moynihan ............. B60R 25/093 235/492
9,908,697 B2 * 3/2018 De Roquette Buisson ................ B65G 1/0492
9,965,908 B2 * 5/2018 Ouyang .................... H04L 9/30
10,089,811 B2 * 10/2018 Ufkes ................. E05B 47/0004
10,373,419 B1 * 8/2019 Smithson ............. G06Q 20/349
10,614,646 B1 * 4/2020 Douglass ........... G07C 9/00309
10,733,681 B2 * 8/2020 Boss .................... G06V 40/173
10,922,629 B2 * 2/2021 Browne ................. G06Q 10/02
2002/0059114 A1 * 5/2002 Cockrill ................. G06Q 20/10 705/40
2003/0033231 A1 * 2/2003 Turner ............... G06Q 30/0239 705/36 R
2003/0061192 A1 * 3/2003 McGunn .................. G07C 9/38
2005/0154605 A1 * 7/2005 Tropp ................... E05B 35/105 70/21
2005/0237149 A1 * 10/2005 Loftin ..................... E05B 47/06 340/5.31
2005/0241003 A1 * 10/2005 Sweeney ................. H04W 4/02 726/28
2006/0068917 A1 * 3/2006 Snoddy .................... B60K 6/40 463/42
2006/0255119 A1 * 11/2006 Marchasin ............ G07F 17/246 235/382
2008/0246583 A1 * 10/2008 Blake ....................... G07C 9/27 340/5.7
2009/0083851 A1 * 3/2009 Michelle ................. G06F 21/31 726/21
2009/0256676 A1 * 10/2009 Piccirillo ........... G07C 9/00309 340/5.65
2009/0328203 A1 * 12/2009 Haas ........................ G07C 9/33 726/20
2011/0074541 A1 * 3/2011 Jones ....................... G07C 9/27 340/5.6
2012/0169461 A1 * 7/2012 Dubois, Jr. ........ G07C 9/00309 340/5.2
2012/0326836 A1 * 12/2012 Sewell ..................... H04Q 9/00 340/4.34
2013/0024528 A1 * 1/2013 Gallant ............... H04L 12/1854 709/206
2013/0335193 A1 * 12/2013 Hanson .............. G07C 9/00174 340/5.61
2014/0207499 A1 * 7/2014 Fliess ..................... G06Q 50/12 705/5
2014/0207657 A1 * 7/2014 Gacs .................. G06Q 30/0645 705/39
2014/0266585 A1 * 9/2014 Chao ........................ G07C 9/27 340/5.61
2014/0375422 A1 * 12/2014 Huber ................ G07C 9/00571 340/5.61
2015/0077223 A1 * 3/2015 Pipes ....................... G07C 9/33 340/5.54
2015/0078137 A1 * 3/2015 Lee .......................... G07C 9/25 367/198
2015/0186840 A1 * 7/2015 Torres .................. A47G 29/141 705/339
2015/0199859 A1 * 7/2015 Ouyang .................... H04L 9/30 340/5.61
2015/0199863 A1 * 7/2015 Scoggins ................. G07C 9/28 340/5.25
2015/0211258 A1 7/2015 Gokcebay
2015/0262154 A1 * 9/2015 Wolfson ............. G06Q 20/3223 705/13
2015/0267438 A1 * 9/2015 Martinez ............ G07C 9/00182 70/278.1
2015/0356801 A1 * 12/2015 Nitu ................... G07C 9/00904 340/5.61
2016/0049036 A1 * 2/2016 Nelson .................. F25D 23/062 312/404
2016/0063235 A1 * 3/2016 Tussy ...................... G06F 21/32 726/6
2016/0109954 A1 * 4/2016 Harris ..................... G06V 20/20 345/156
2016/0155293 A1 * 6/2016 Reaves ............... G07F 17/3234 463/25
2017/0161978 A1 * 6/2017 Wishne ................... G07F 17/14
2017/0236352 A1 * 8/2017 Conrad ................... G01S 19/13 340/5.61
2017/0323301 A1 * 11/2017 Weiss ..................... G06Q 20/20
2018/0115595 A1 * 4/2018 Krishnan .............. H04L 67/025
2018/0216364 A1 * 8/2018 Wind .................... E05B 1/0007
2018/0230713 A1 * 8/2018 Sidhu .................... E05B 67/003
2018/0253786 A1 * 9/2018 Frisby ..................... G07F 9/002
2018/0262891 A1 * 9/2018 Wu ...................... H04W 12/065
2018/0350170 A1 * 12/2018 Wang ..................... G07C 9/215
2019/0259232 A1 * 8/2019 Nandakumar ..... G06Q 10/0838
2019/0371101 A1 * 12/2019 Friedli ..................... G07C 9/38
2020/0190854 A1 * 6/2020 Tropp ................. E05B 37/0034
2020/0318389 A1 * 10/2020 Luo ....................... E05B 35/105

* cited by examiner

SYSTEM AND METHOD FOR TRANSMITTING UNLOCK CODES BASED ON EVENT TRIGGERS

CROSS-REFERENCE TO RELATED APPLICATIONS

This application is a continuation of, and claims benefit to U.S. Non-Provisional patent application Ser. No. 18/196,007 filed on May 11, 2023, which is a continuation of, and claims benefit to U.S. Non-Provisional patent application Ser. No. 17/963,296 filed on Oct. 11, 2022, now U.S. Pat. No. 11,663,650, which is a continuation-in-part of, and claims benefit of and priority to U.S. Non-Provisional patent application Ser. No. 17/861,731 filed on Jul. 11, 2022, now U.S. Pat. No. 11,538,098, which is a continuation-in-part of, and claims benefit of and priority to U.S. Non-Provisional patent application Ser. No. 17/547,289 filed on Dec. 10, 2021, now U.S. Pat. No. 11,416,919, which is a continuation-in-part of, and claims benefit of and priority to U.S. Non-Provisional patent application Ser. No. 17/151,609 filed on Jan. 18, 2021, now U.S. Pat. No. 11,232,513, which is a continuation of, and claims benefit of and priority to U.S. Non-Provisional patent application Ser. No. 16/545,247 filed on Aug. 20, 2019, now U.S. Pat. No. 10,922,747, which claims priority from U.S. Provisional Patent Application No. 62/722,379 filed Aug. 24, 2018, and further U.S. Non-Provisional patent application Ser. No. 16/545,247 is a continuation-in-part of, and claims benefit to, U.S. Non-Provisional patent application Ser. No. 15/962,583 filed Apr. 25, 2018, now U.S. Pat. No. 10,475,115, which is a continuation-in-part of, and claims benefit to, U.S. Non-Provisional patent application Ser. No. 15/914,179 filed Mar. 7, 2018, now U.S. Pat. No. 10,614,650, which claims benefit to U.S. Provisional Patent Application No. 62/560,900 filed on Sep. 20, 2017, all of the above of which are incorporated herein by reference in their entireties.

BACKGROUND

Field of the Invention

The present invention relates generally to the field of over-lock and release systems for rentable facilities. More particularly, the invention is a distributed management system for self-storage facilities that allow for vacant units to be secured with over-locks, and which allow the over-locks to be removed by customers without human or manual intervention from the self-storage facility.

Description of Related Art

Self-storage units are typically rented on a monthly basis. If a customer is delinquent, and does not pay their rent to the self-storage facility owner by an agreed-upon due date, the owner (i.e., landlord) has a right to prevent the customer from accessing the storage unit. Self-storage facility owners typically place an over-lock over the storage unit door, such as through a hasp that prevents opening of the door. The over-lock is utilized until the customer pays the delinquent past due balance on their account.

The process of placing, and removing over-locks, can be quite burdensome on a self-storage facility owner, especially with large facilities with hundreds of storage units, the majority of which may be rented to month-to-month customers. After an over-lock is placed on a storage unit, the over-lock must ultimately be removed once the customer account becomes non-delinquent. Removing over-locks is time-consuming and costly because it requires personnel from the self-storage facility to physically go to the storage unit and remove the over-lock.

In addition, the cost of conventional over-locks can be prohibitive. Many conventional over-locks are electronic and provide automated and remote locking/unlocking functions. Such over-locks oftentimes require significant capital improvements on the storage structures, as these over-locks must be installed behind the storage door on the interior of the space. Furthermore, these electronic locks inherently require constant power, and their continuous twenty-four hour operation increases power consumption costs for the self-storage facility.

Furthermore, as with any complex electronic device, electronic over-locks are subject to failure and malfunction, and can require costly repairs to be conducted by an electrician, if not ultimately requiring replacement.

Other conventional over-locks include standard combination locks. However, with a self-storage facility utilizing a limited number of standard combination over-locks, habitually delinquent customers eventually begin to recognize the unlock codes, and these over-locks become futile. The self-storage facility must then perpetually replace over-locks with unlock codes that have become known and compromised.

Another disadvantage of standard combination over-locks is the potential for delayed access to the customer. If the customer makes a payment and brings their account current when the self-storage management office is closed or when personnel are unavailable, such as on weekends, after-hours, or holidays, the customer must then wait until the office is open and there are personnel available to remove the over-lock. Thus, the customer cannot gain access to their storage unit and possessions immediately after making payment to bring their account current. The delay between such a payment and removal of the over-lock does not cater to tenants who may need immediate access to their storage unit.

Another challenge in managing self-storage facilities is securing vacant storage units when they are not being rented. If the vacant units are not properly secured, these units can be entered illegally and be used to store items for free by unauthorized persons, could be used to discard trash, and could be used for other illicit or illegal activities that could pose liability and safety issues for the self-storage facility and customers of the self-storage facility. Currently, vacant units must be secured using traditional locks. In the event a locked vacant unit is subsequently rented, a representative of the self-storage facility must manually visit the unit and remove the lock. Such a process is burdensome, manually intensive, and increases the time between a customer renting a unit, and actually being able to access the unit.

Thus, there is a need in the self-storage industry for a system that allows or disallows access to an over-locked storage unit, such as a vacant storage unit, without the need for an on-site attendant. Such a distributed over-lock system would allow for immediate access to an over-locked storage unit, would encourage delinquent customers to bring an account current in a timely fashion, and would reduce operational costs associated with conventional electronic and standard combination over-lock systems.

SUMMARY

In one embodiment, the invention is directed to a method for transmitting unlock codes for locks based on trigger events, the method comprising: securing a storage unit with a lock, wherein the lock is not capable of electronic communication, wherein an unlock code is associated with the lock in a database coupled to a management system, wherein the lock is associated with the storage unit in the database, the management system executing on a processor configured to: (i) monitor the database to determine if the storage unit becomes associated with a customer account, (ii) if the storage unit becomes associated with a customer account, retrieve the unlock code and retrieve an email address associated with the customer account from the database, and (iii) transmit the unlock code to the email address.

In another embodiment, the invention is directed to a method for transmitting unlock codes for locks based on trigger events, the method comprising: securing a storage unit with a lock, wherein the lock is not capable of electronic communication, wherein an unlock code is associated with the lock in a database coupled to a management system, wherein the lock is associated with the storage unit in the database, the management system executing on a processor configured to: (i) monitor the database to determine if the storage unit becomes associated with a customer account, (ii) if the storage unit becomes associated with a customer account, retrieve the unlock code and retrieve a telephone number associated with the customer account from the database, and (iii) transmit the unlock code to the telephone number.

In yet another embodiment, the invention is directed to a method for transmitting unlock codes for locks based on trigger events, the method comprising: securing a storage unit with a lock, wherein the lock is not capable of electronic communication, wherein an unlock code is associated with the lock in a database coupled to a management system, Wherein the lock is associated with the storage unit in the database, and wherein the storage unit is associated with a customer account in the database, the management system executing on a processor configured to: (i) monitor the database to determine if a customer account changes from a delinquent state to a current state, (ii) if the customer account changes from the delinquent state to the current state, retrieve the unlock code and retrieve a contact information associated with the customer account from the database, and (iii) transmit the unlock code to a mobile device associated with the contact information.

BRIEF DESCRIPTION OF THE DRAWINGS

These and other embodiments of the disclosure will be discussed with reference to the following exemplary and non-limiting illustrations, in which like elements are numbered similarly, and where.

DETAILED DESCRIPTION

It should be understood that aspects of the invention are described herein with reference to the figures, which show illustrative embodiments. The illustrative embodiments herein are not necessarily intended to show all embodiments in accordance with the invention, but rather are used to describe a few illustrative embodiments. Thus, aspects of the invention are not intended to be construed narrowly in view of the illustrative embodiments. In addition, the present invention is an over-lock and release system. Although the system is described with respect to its application for self-storage facilities, it is understood that the system could be implemented in any setting where an over-lock system may be useful.

Figure 1:
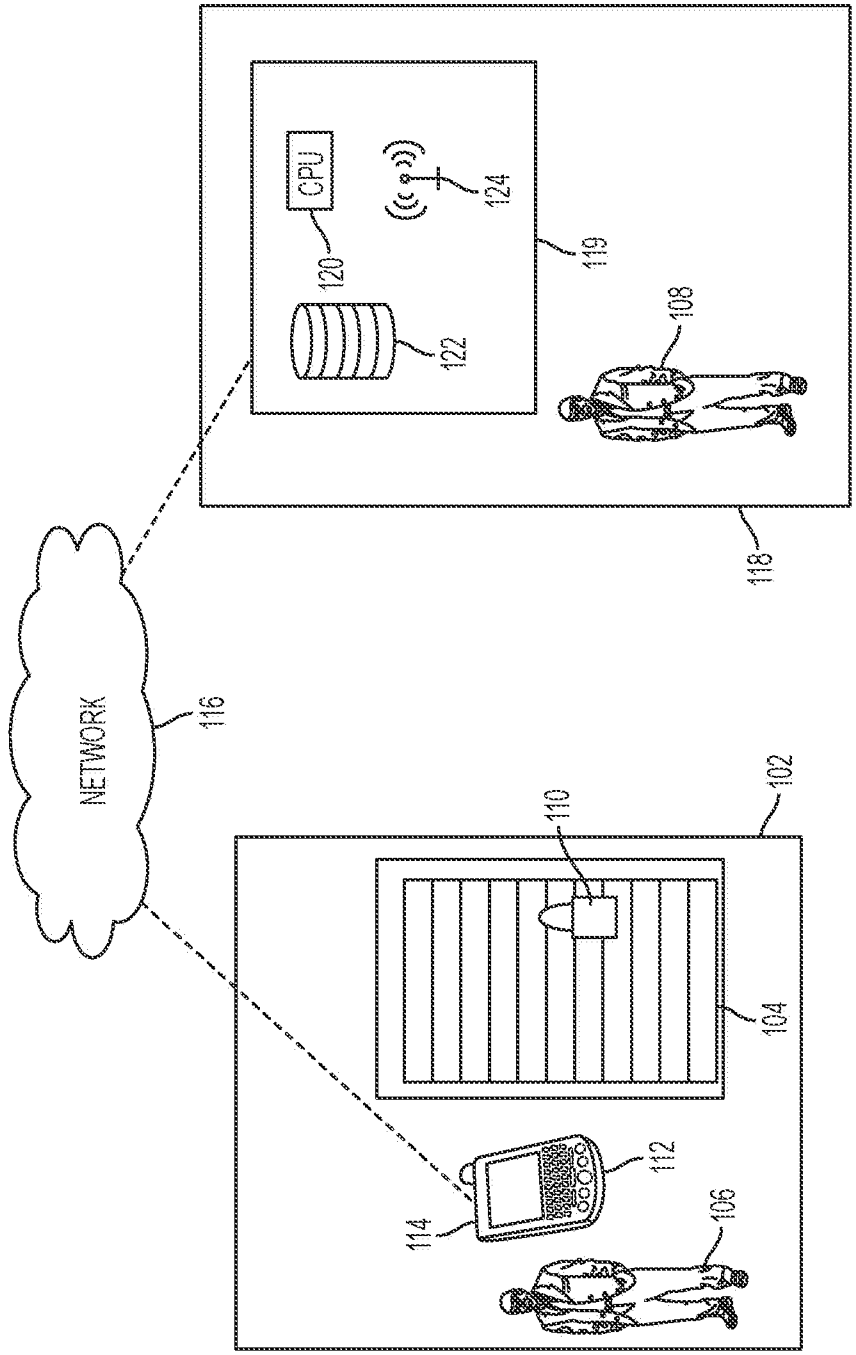
FIG. 1 is a network architecture diagram of a distributed encrypted combination over-lock and release system.

FIG. 1 is a network architecture diagram of a distributed encrypted combination over-lock and release system. In an embodiment, the system can be implemented within a self-storage environment. The system includes a self-storage facility 102 coupled to a management site 118 via a network 116. The management site 118 can be remote from the self-storage facility 102, and the management site 118 can serve multiple distributed self-storage facilities, such as in a central management site. The management site 118 can further be located overseas, such as in a foreign call center.

In an embodiment, the management site 118 includes computing hardware and software 119, consisting of a processing unit 120, a database 122, and a transceiver 124. The computing hardware and software 119 can include a server coupled to the network 116. In another embodiment, the processing unit 120 and database 122 can be cloud-based, and located on a server remote from the management site 118, such as on a server provided by Amazon Web Services® or the like. In an embodiment, the processor 120 and/or database 122 can be distributed systems, such as that multiple distributed/cloud based units, structures, devices, or servers are utilized. In yet another embodiment, the database 122 is a database in which operational data is spread across different physical or virtual locations, and comprises more than one cloud based databases and/or data processing systems.

In another embodiment, the management site 118 can be located within the local vicinity of the self-storage facility 102, such as on-site. The management site 118 can be a physical location with human personnel, such as a self-storage manager 108. In another embodiment, the management site 118 can be unmanned, and can include only the computing hardware and software 119. The network 116 may be any type of network suitable to allow interaction between devices, such as a mobile device 112 located at self-storage facility 102, and the computing hardware and software 119 at the management site 118. For example, the network 116 may be a wired network, a wireless network, or any combination thereof. Further, the network 116 may include a distributed computing network, an intranet, a local-area network (LAN) and/or a wide-area network (WAN), or any combination thereof. For example, the LAN may make use of WIFI in its many variations and the WAN may make use of broadband, cellular and/or satellite networks using technologies including, but not limited to, CDPD, CDMA, GSM. PDC, PHS, TDMA, FLEX, ReFLEX, iDEN, TETRA, DECT, DataTAC, Mobitex, EDGE and other 2G, 3G, 4G and LTE technologies. However, those of ordinary skill in the art will appreciate that the network 116 is not limited thereto.

The self-storage facility 102 can include a storage unit 104, which can be rented by a customer 106. As used herein, the term "customer" can include a renter, client, tenant, lessee, user, or an authorized agent. Although the invention will be described with respect to self-storage facilities, the invention can be implemented in any setting where an over-lock system may be useful, such as hotel rooms, apartment buildings, storage containers, short-term housing rentals, and lockers. In addition, the invention can be implemented within a controlled access system, such as for equipment rooms, vaults, hospitals, airports, government facilities, nuclear power facilities, water treatment facilities, weapon storage facilities, aircraft cockpits, and any other setting that requires restricted, selective, or monitored access.

In the event that customer 106 becomes delinquent in the payment of rent, the self-storage manager 108 can place an over-lock 110 on the storage unit 104. The over-lock 110 is a secondary lock that is used to prevent the customer 106 from accessing the storage unit 104 until the delinquent past due balance is paid by customer 106.

In a preferred embodiment, the over-lock 110 is a combination padlock that requires an unlock code to be manually entered in order to open the over-lock 110. In another embodiment, the over-lock 110 can be deadbolt, knob lock, or lever lock that includes a combination mechanism. The combination mechanism can include a tubular barrel, a rotary knob, pushpins, or a mechanical keypad. In another embodiment, the over-lock 110 can be an electronic lock that accepts a combination input via digital keys or a touch-screen. In an embodiment, the over-lock 110 is a lock with no electronic circuitry or electronic components, and the over-lock 110 is not capable of electronic communication with any remote or local systems.

In an embodiment, the over-lock 110 can include an identifier, such as a serial number, unique code, barcode, QR code, or other unique indicia. In an embodiment, the identifier is engraved onto the over-lock 110. In other embodiments, the identifier is affixed via a label to the over-lock 110, affixed to a tag that is attached to the over-lock 110, or otherwise imprinted, drawn, or engraved on the over-lock 110 or tag.

Upon payment of a delinquent past due balance by the customer 106, the management site 118 can enable the release of an unlock code for the over-lock 110. At this time, the customer 106 can use a mobile device 112, such as their mobile phone, to access a software application 114 created by the self-storage manager 108. The software application 114 can be a proprietary program created and/or owned by the self-storage facility 102, and which can be downloaded by the customer 106 from, for example, a website operated by the self-storage manager 108, the Apple iTunes App Store®, the Android App Store®, and the like.

The software application 114 can allow bi-directional communication between the mobile device 112 and the management site 118, self-storage manager 108, processor 120, database 122, and/or transceiver 124.

In yet another embodiment, the software application 114 is a website accessed via a Uniform Resource Locator (URL) using a browser on the mobile device 112.

The mobile device 112 is not limited to a mobile phone, and can include tablets, wearable devices, personal digital assistants (PDAs), laptop computers, "smart" watches, "smart" glasses, and any other device capable of receiving input from the customer 106, and which is capable of being connected to the network 116.

The software application 114 includes an interface that allows the customer 106 to enter the identifier. The identifier is then transmitted from the mobile device 112 via a network 116 to the management site 118. The identifier is received by the transceiver 124, and routed to the processing unit 120. The processing unit 120 performs a decryption and/or look-up operation in the database 122, and retrieves an unlock code for the over-lock 110 that is associated with the identifier. The unlock code is then transmitted by the transceiver 124 to the mobile device 112 via the network 116. The unlock code is subsequently displayed to the customer 106 on the mobile device 112 via the software application 114. Upon receiving the displayed unlock code, the customer 106 can then unlock the over-lock 110, and re-gain access to the storage unit 104.

Figure 2:
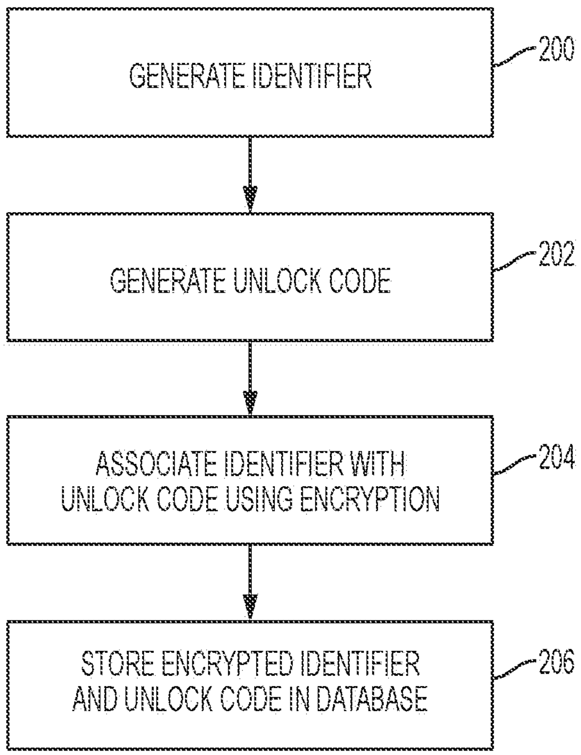
FIG. 2 is a flowchart illustrating the steps of encrypting an unlock code for a combination over-lock.

FIG. 2 is a flowchart illustrating the steps of encrypting an unlock code for a combination over-lock. In step 200, a unique identifier is generated for the over-lock 110. The identifier can be generated at the time of manufacturing by the over-lock manufacturer, and can be transmitted with the over-lock 110 at the time of purchase by the self-storage facility. In this embodiment, the identifier can be engraved or permanently affixed to the over-lock 110.

In another embodiment, the identifier is generated by the self-storage facility. In this embodiment, an algorithm on the processing unit 120 randomly generates the identifier, or it can be generated manually by the self-storage facility. In another embodiment, a third-party over-lock provider can generate the identifier, and can sell or lease the over-locks to a self-storage facility. The third-party over-lock provider can manage the computing hardware and software 119 for the self-storage facility, and/or can lease the computing hardware and software 119 to the self-storage facility.

In an embodiment, the identifier can be generated using an encryption technique that utilizes the unlock code as an input. In addition, another identifying input can be utilized for the encryption along with the unlock code, such as a self-storage facility identifier, federal tax identification number, or a randomly generated string of characters.

In an embodiment, the identifier can be a string of numeric characters, alphabet characters, special characters, or a combination of alphanumeric and/or characters. In addition, the identifier can include a portion identifying the self-storage manager 108, the self-storage facility 102, and/or the customer 106.

In an embodiment where the identifier is a barcode, matrix code, a QR code, or a similar scannable code, the identifier can be printed on the over-lock 110 at the time of manufacture, or alternatively, the identifier can be printed on label and affixed to the over-lock 110 or a tag attached to the over-lock 110 by either the manufacturer or the self-storage facility.

In another embodiment, the over-lock 110 or tag can have a digitally imprinted code and/or microchip, such as a RFID or Bluetooth low energy transmitter. The customer 106 can be provided with a physical key fob that can read the code sent from the microchip, and which can display the code to the user. The key fob can be implemented into a software application on the mobile device 112 as well. In this embodiment, the identifier is not readily visible, which adds a layer of security against the over-lock 110, and its corresponding unlock code, becoming known over a period of time due to re-use.

In step 202, the unlock code is generated for the combination over-lock 110. Again, the unlock code can be generated at the time of manufacturing by the over-lock manufacturer, and transmitted with the over-lock 110 at the time of purchase by the self-storage facility.

In another embodiment, the self-storage facility can generate the unlock code for the over-lock 110. The unlock code can be randomly generated by an algorithm on the processing unit 120, or generated manually by the self-storage manager 108.

In an embodiment, the identifier and/or unlock code can be time-limited, and can expire after a pre-determined amount of time or on a certain date. In this embodiment, the expired identifier and/or unlock code must be re-generated as per step 200 and 202 above.

In an embodiment, the unlock code can be generated using an encryption technique that utilizes the identifier as an input. In addition, another identifying input can be utilized for the encryption along with the identifier, such as a self-storage facility identifier, federal tax identification number, or a randomly generated string of characters.

In step 204, the processing unit 120 associates the identifier with the unlock code for the over-lock 110 using an encryption technique. The encryption technique can include at least one of a hash function, a key derivation function, a block cipher operation, and an obfuscation function. In addition, the encryption algorithm used by the processing unit 120 can include a Triple Data Encryption Standard (DES) algorithm, a RSA cryptosystem algorithm, a Blowfish cipher algorithm, a Twofish cipher algorithm, or an Advanced Encryption Standard (AES) algorithm.

In step 206, the encrypted identifier and unlock code pair is stored in the database 122. The database 122 can be stored locally at the management site 118, can be located on a remote cloud-based server, or at another facility remote from the management site 118.

In yet another embodiment, each storage unit 104 can include a scannable code, such as a barcode, located on a visible portion of its exterior. Each over-lock 110 can also include a barcode as its identifier, as described above. Upon applying the over-lock to a storage unit 104, the self-storage manager 108 can scan both barcodes. These barcodes are then transmitted to the processing unit 120, where the barcode pairs are associated with each other and stored in the database 122.

Figure 3:
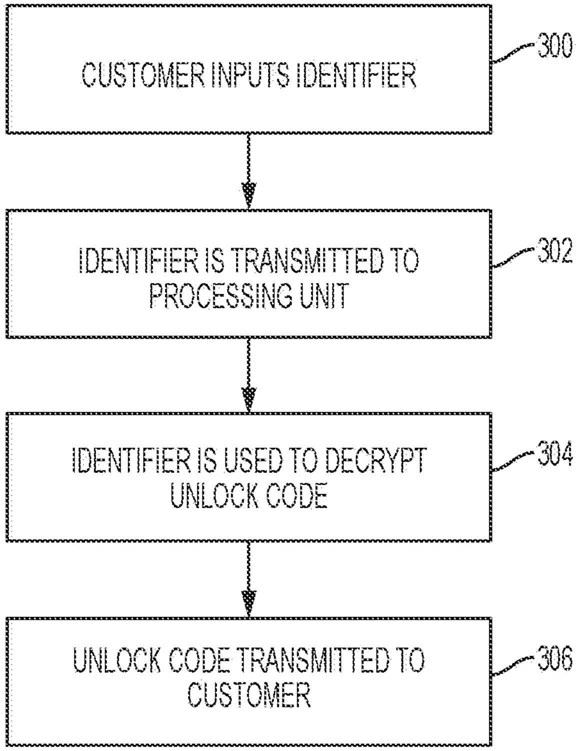
FIG. 3 is a flowchart illustrating the steps of decrypting an unlock code for a combination over-lock.

FIG. 3 is a flowchart illustrating the steps of decrypting an unlock code for a combination over-lock. In step 300, upon encountering an over-lock 110 on their storage unit 104, the customer 106 locates the identifier on the over-lock 110. The customer 106 can enter the identifier into a software application 114 on their mobile device 112, as described above. In an embodiment, the customer 106 can take a picture of the identifier and send it via text, SMS, MMS, email, or secure message through the software application to the management site 118. In another embodiment, the customer 106 can initiate a live-stream or video chat of the identifier with the management site 118, using, for example. Apple FaceTime®, Skype®, Snapchat®, or the like. In another embodiment, the identifier can be entered through a website accessed via a URL using a browser on the mobile device 112.

In another embodiment, the customer 106 can scan a barcode, matrix code, a QR code, or a similar scannable code with a camera or optical pickup means on the mobile device 112. The scanned identifier is then transmitted to the management site 118.

In yet another embodiment, the customer 106 can place a telephone call to the remote management site 106 and/or the self-storage manager 108 and provide the identifier and/or their credentials verbally.

In an embodiment, prior to being able to access the software application 114, the customer 106 must enter credentials, such as a login and password, or other indicia that verifies the customer's identity. The credentials may also be supplied via biometric means, such as with fingerprint, iris, voice, face, and gesture recognition means incorporated into the mobile device 112 and/or software application 114. In another embodiment, the credential can include a one-time or limited use password provided by a secure token, such as a RSA SecurID®.

In another embodiment, the credentials may be transmitted along with the identifier. In this embodiment, the credentials can include customer's mobile device number, login, password, email address, phone number, account number, personal identification number (PIN), name, driver's license number, social security number, birthdate, storage unit number, and/or a unique account identification code previously provided to the customer 106 by the self-storage facility and/or any combination thereof.

In yet another embodiment, the customer 106 can designate authorized parties who can request the unlock code as well. For example, a customer's spouse, authorized agents, business associates, attorneys, and any other parties whom the customer 106 wishes to have access to the storage unit 104 can have their credentials associated with the storage unit. In this embodiment, the database record for the storage unit 104 and/or over-lock 110 includes a listing of all authorized parties and their respective credentials.

In step 302, the identifier, along with the credentials, if required, are transmitted to the management site 118 via the network 116. In an embodiment, the identifier is specifically transmitted to the computing hardware and software 119, which can be located at the management site 118, or alternatively, located at a remote facility or server communicatively coupled to the management site 118.

As described above, the management site 118 and/or processing unit 120 can be located remotely from the self-storage facility 102, and thus, the network 116 can include a WAN and utilize broadband, cellular, and/or satellite communication means. In another embodiment, the processing unit 120 can be located on-site at the self-storage facility 102. In this embodiment, in addition to the aforementioned communication means, the mobile device 112 can utilize a short-range communication protocol, such as Bluetooth®, infrared, ZigBee®, and/or optical wireless, to communicate with the computing hardware and software 119.

In step 304, the processing unit 120 receives the identifier. The processing unit 120 uses the identifier as an input to decrypt the unlock code. Various decryption techniques may be employed, and such techniques can include the use of private and public keys. In another embodiment, the decryption step involves performing a look-up operation in the database 122 to locate the over-lock record associated with the identifier. Once the relevant record is located, the processing unit 120 extracts the unlock code from the over-lock record. The look-up operation can be standalone, or in addition to the decryption techniques described herein.

In another embodiment, the unlock code and identifier can both be randomly generated, either using an algorithm on a computing device, or manually. The randomly generated unlock code and identifier can then be linked or associated with one another in a database, table, matrix, ledger, or the like. The linking/associating can be done r,rndc,rn iy using an algorithm on the computing device, or can be done manually.

In step 306, the unlock code is transmitted to the mobile device 114 via the network 116 using a transceiver 124 coupled to the processor 120. Upon receipt by the mobile device 112, the software application 114 displays the unlock code to the customer 106. In yet another embodiment, the unlock code can be transmitted to the mobile device 112 from the management site 118 via SMS, MMS, email, or video chat. In yet another embodiment, the self-storage facility can place a telephone call to the customer 106 and verbally provide the unlock code. In this embodiment, human personnel, such as the self-storage manager 108 at the management site 118, can place via an automated system or the telephone call.

Figure 4A:
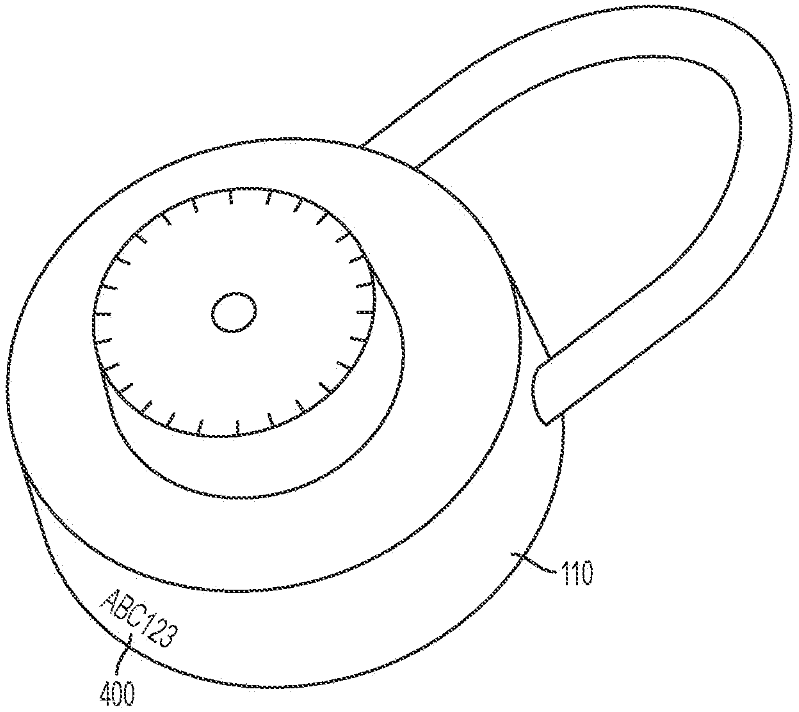
FIG. 4A is a perspective illustration of a combination over-lock according to an embodiment of the invention.

FIG. 4A is a perspective illustration of a combination over-lock according to an embodiment of the invention. The combination over-lock 110 includes an identifier 400, which can be engraved or otherwise permanently affixed to the over-lock 110. In another embodiment, the identifier 400 can be on a label affixed to the over-lock 110, such as an adhesive label. The identifier 400 can be located on an underside of the over-lock 110, as shown in FIG. 4A, or can be located on the front-face, rear plate, or shackle.

Figure 4B:
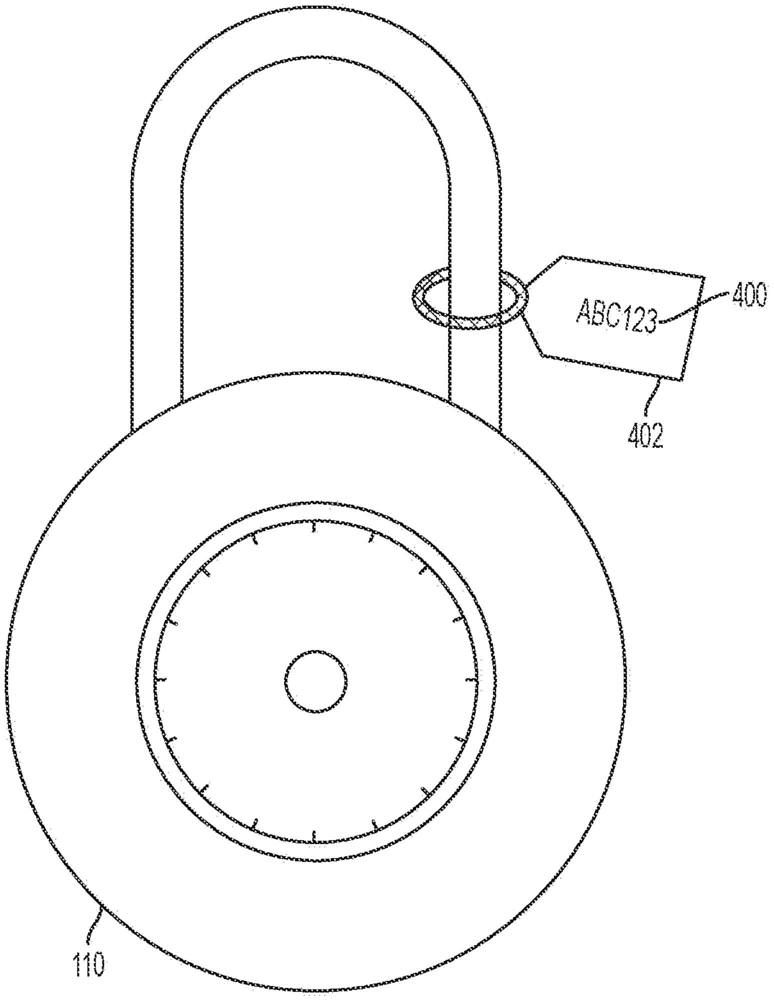
FIG. 4B is a perspective illustration of a combination over-lock with an identifier tag according to an embodiment of the invention.

FIG. 4B is a perspective illustration of a combination over-lock with an identifier tag according to an embodiment of the invention. In this embodiment, the identifier 400 is located on a tag 402 that is affixed to the over-lock 110. The tag 402 can be affixed to the shackle, the combination knob, or alternatively, can be applied partially via adhesive to any surface of the over-lock. The tag 402 can be placed within a weatherproof encasement (not shown).

Figure 4C:
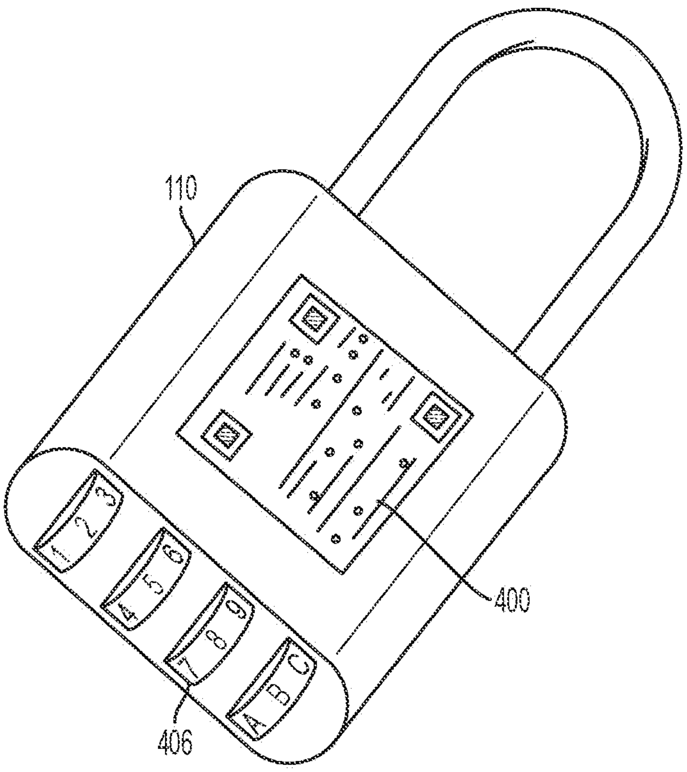
FIG. 4C is a perspective illustration of a combination over-lock with a barrel tumbler according to an embodiment of the invention.

FIG. 4C is a perspective illustration of a combination over-lock with a barrel tumbler according to an embodiment of the invention. In this embodiment, the identifier 400 is a scannable code, such as a barcode, and is located on the front or rear surface of the over-lock 110. The unlock code can be manually entered using the barrel tumbler 406 on the underside of the over-lock 110. The over-lock 110 depicted in FIG. 4C is shown as an example, and various designs of locks having a barrel tumbler, a rotary knob, push-pins, or a mechanical keypad can be utilized with this invention, such as combination input mechanism can also be located on a side or front face of the over-lock 110.

Figure 4D:
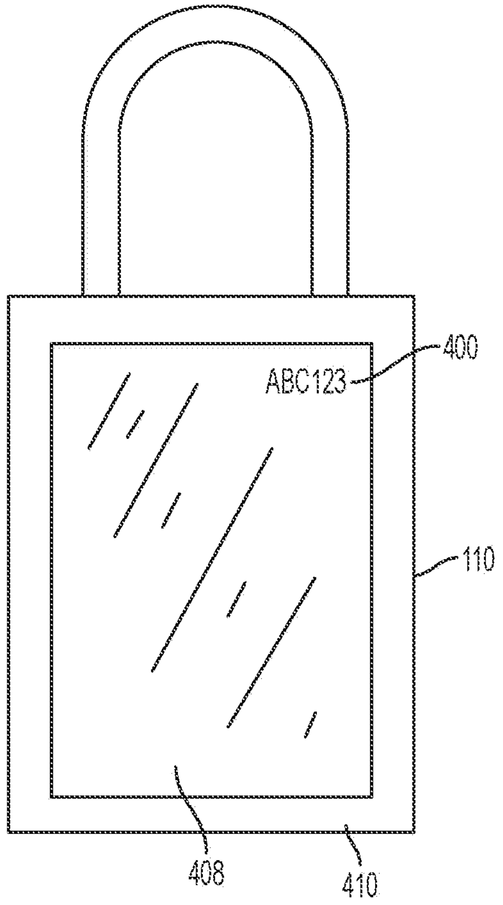
FIG. 4D is a perspective illustration of an electronic over-lock with an interface according to an embodiment of the invention.

FIG. 4D is a perspective illustration of an electronic over-lock with an interface according to an embodiment of the invention. In this embodiment, the over-lock 110 includes an interface, such as a touch-screen 408. The identifier 400 can be located on the casing 410 or shackle 412, or affixed to the over-lock 110 via a tag (not shown) similar to the embodiments shown in FIGS. 4A-4C. In another embodiment, the identifier 400 can be displayed on the touch-screen 408. The electronic over-lock 110 can function similarly to the mobile device 114, and can include circuitry for accepting customer input and for transmitting and receiving data from a remote source. In this embodiment, the customer 106 can access the software application 116 via the touch-screen 408, and can enter their credentials and the identifier. The electronic over-lock 110 can then transmit the identifier to the management site 118. Upon a successful decryption at the management site 118, the unlock code is transmitted to the over-lock 110, which is automatically unlocked without further customer intervention.

Figure 5:
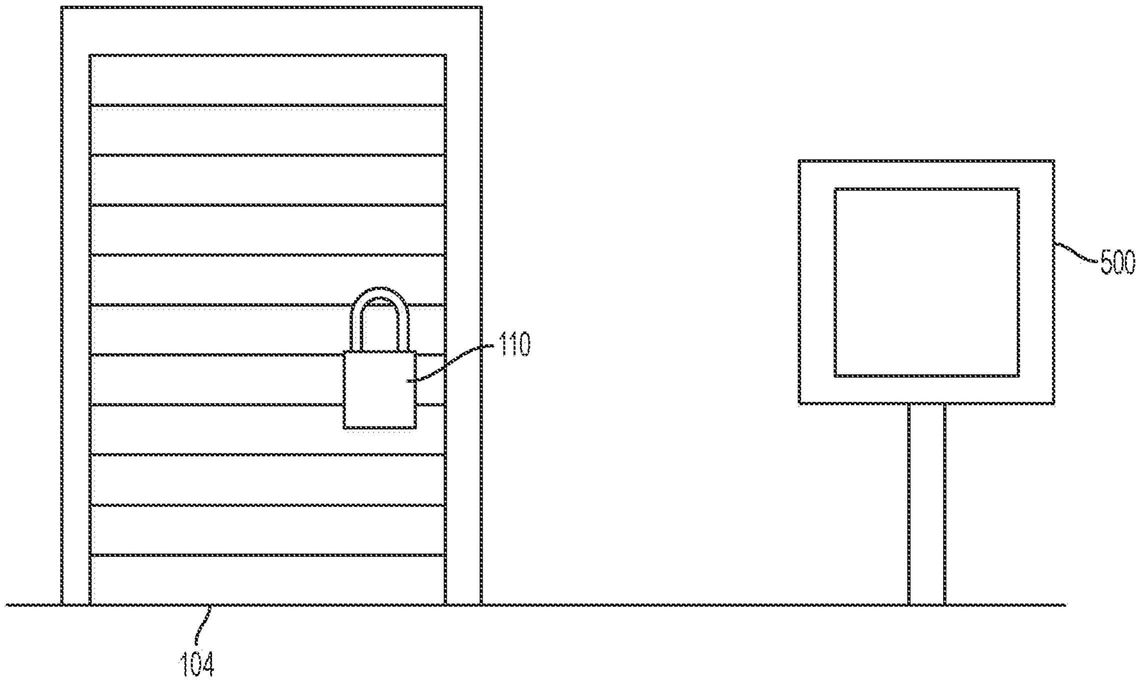
FIG. 5 is a diagram of a kiosk and storage unit according to an embodiment of the invention.

FIG. 5 is a diagram of a kiosk and storage unit according to an embodiment of the invention. In another embodiment, the storage unit 104 can include a kiosk 500, either adjacent to the storage unit 104, or located at the self-storage facility 102. The kiosk 500 can function similar to the mobile device 114, and allow the customer 106 to request an unlock code. The kiosk 500 can accept an identifier from the over-lock 110, and can then transmit the identifier to the management site 118. Upon a successful decryption at the management site 118, the unlock code is transmitted for display at the kiosk 500. The kiosk 500 can also perform other services and management functions for the self-storage facility 102, such as accepting payments, processing storage unit rentals, providing voice and chat operations with the self-storage manager 108 and/or management site 118, and vending accessories.

In another embodiment, the customer 106 can utilize the kiosk 500 to request an unlock code, and the unlock code is returned for display to the mobile device 112, or vice-versa.

Figure 6A:
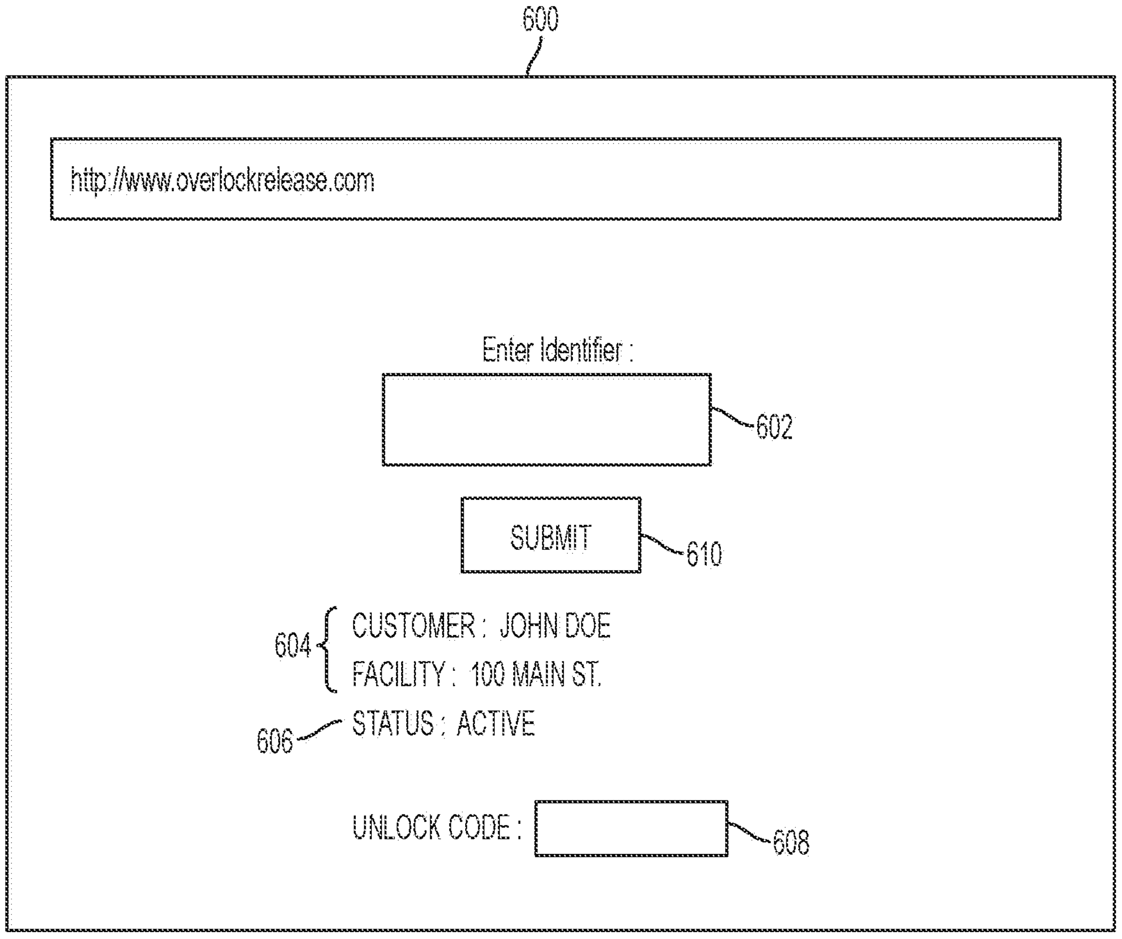
FIG. 6A is an illustration of an over-lock release interface for a software application according to an embodiment of the invention.

FIG. 6A is an illustration of an over-lock release interface for a software application according to an embodiment of the invention. The unlock interface 600 can be displayed on the mobile device 112 once the customer 106 activates the software application 114. The unlock interface 600 allows the customer 106 to enter an identifier for the over-lock 110 at input box 602. The unlock interface 600 can also display information 604 such as the customer name and facility name, and customer status 606. The customer status 606 can be either “current” (i.e., paid in full and in good standing), or “delinquent” (i.e., having a past due balance). In an embodiment, the customer status 606 can include be “pending”, indicating that a payment has been submitted, but not yet processed, such as in the case of wire transfers or digital currency payments which typically require a delay in settlement.

In an embodiment, the unlock code 606 is displayed after the customer 106 transmits the identifier by selecting the “SUBMIT” button 610, and after the processing unit 120 successfully decrypts the unlock code.

In another embodiment, the interface 600 does not include the unlock code 606, and the unlock code is transmitted to the customer 106 via a text, SMS, MMS, email, video chat, secure message via the software application, or telephone call.

Figure 6B:
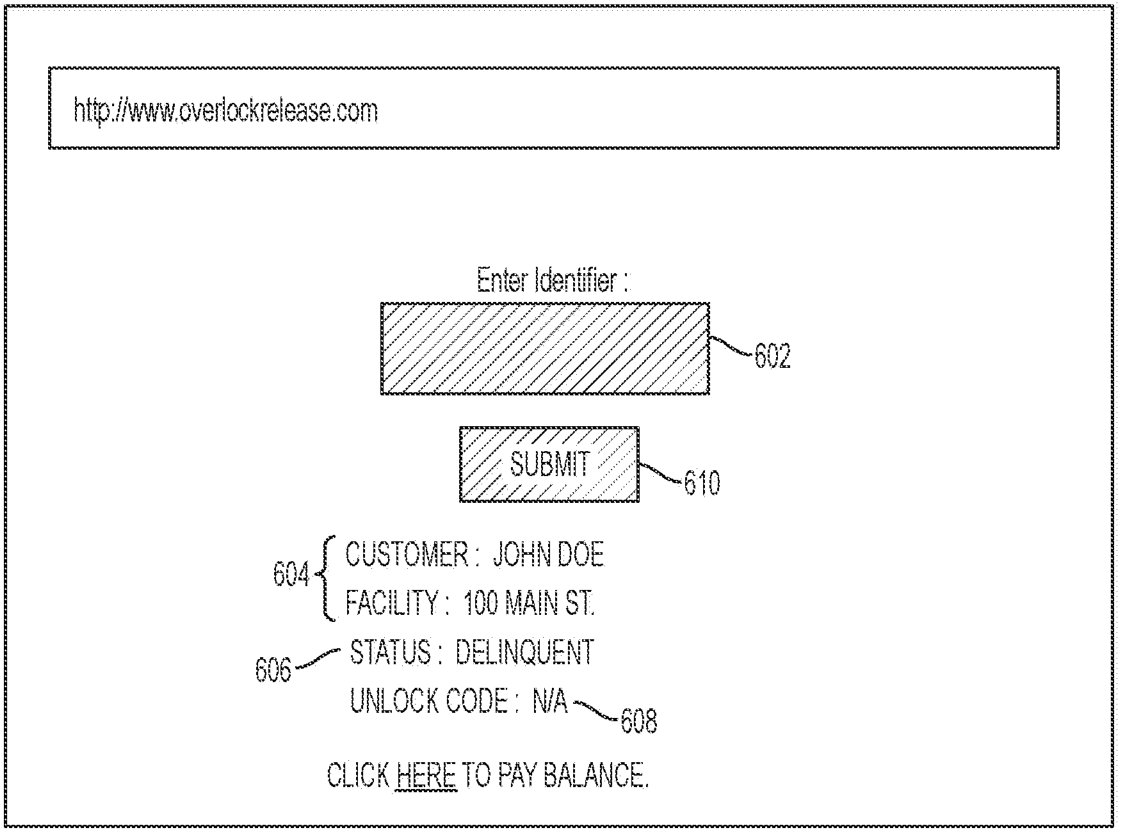
FIG. 6B is an illustration of an over-lock release interface for a software application according to an embodiment of the invention.

FIG. 6B is an illustration of an over-lock release interface for a software application according to an embodiment of the invention. In the event that the customer 106 has not made payment on a delinquent past due balance, and still attempts to retrieve the unlock code, the customer status 606 will be listed as “Delinquent”. In addition, the “SUBMIT” button 610 will be greyed our or inactive, so that the customer 106 cannot submit the identifier. In another embodiment, the customer 106 may not even reach the unlock interface 600, and rather, is directed toward a billing webpage upon launching the software application 114, where they can make a payment to rectify, their delinquent account (not shown).

Figure 7:
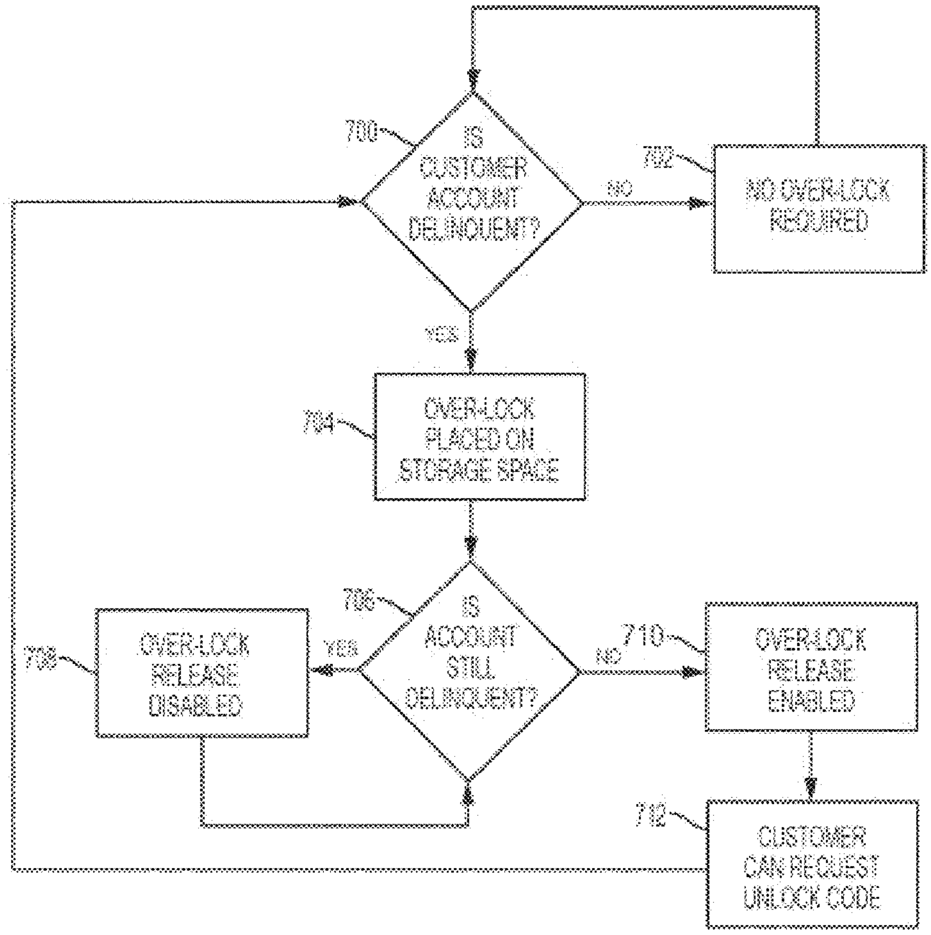
FIG. 7 is a flow chat illustrating the steps of enabling and disabling an over-lock according to the embodiment of the invention.

FIG. 7 is a flow chart illustrating the steps of enabling and disabling an over-lock according to the embodiment of the invention. In step 700, the management site 118 determines if a customer account is delinquent. If the account is current and there is no outstanding past due balance, the process terminates at step 702 and no over-lock 110 is required. The process continues back to step 700 where the customer account is continually monitored for delinquency by the management site 118.

If the customer account is delinquent, the process continues to step 704, where an over-lock 110 is placed on the storage unit 104. The over-lock 110, in a preferred embodiment, is manually placed over the primary lock or latch, thereby preventing movement of the door hasp, even if the primary lock is removed.

In another embodiment, the customer 106 can have multiple storage units on their account. If the customer 106 is delinquent on all or part of their account, all of the storage units on the customer’s account can be over-locked. In another embodiment, only select storage units or a single storage unit can be over-locked, based on the amount or extent of delinquency on the account.

In step 706, the processing unit 120 determines if the customer account is still delinquent. If the account is still delinquent, the processing unit 120 disables the over-lock release function. In this scenario, the processing unit 120 prevents the over-lock release interface shown in FIG. 6B from returning an unlock code. In another embodiment, if the customer 106 attempts to request an unlock code via text message, email, video chat, or telephone call while having a delinquent past due account status, the customer 106 will be informed by the self-storage facility that their account is delinquent, and they cannot retrieve the unlock code.

If the customer’s account is no longer delinquent in step 706, then the process continues to step 710, where the over-lock release is enabled by the processing unit 120, and the customer 106 can retrieve the unlock code in step 712. The process continues back to step 700 where the customer account is continually monitored either by the self-storage facility.

Figure 8:
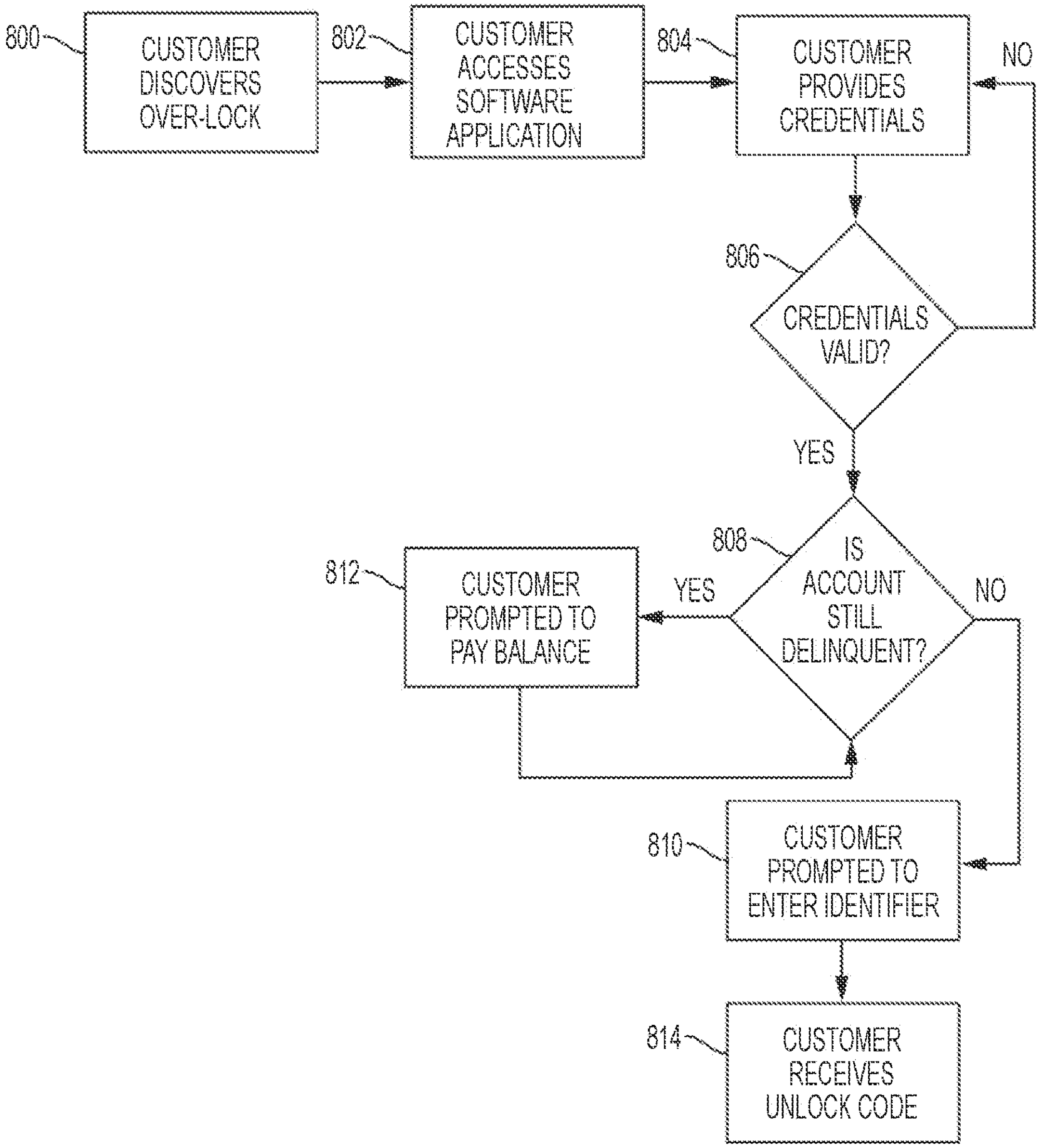
FIG. 8 is a flowchart illustrating the steps taken by a customer to retrieve an unlock code using the software application according to an embodiment of the invention.

FIG. 8 is a flowchart illustrating the steps taken by a customer to retrieve an unlock code using the software application according to an embodiment of the invention. In step 800, the customer 106 discovers that their storage unit 104 has been over-locked.

In step 802, the customer 106 follows instructions on a notice from the self-storage facility to access the software application 114 in order to retrieve an unlock code for the over-lock 110. In an embodiment, a notice, such as a hangtag, placard, sign, or other indica, is placed on the over-lock 110, adjacent to the over-lock 110, and/or on a door or frame of the storage unit. The notice can include instructions on how to access the software application 114. As discussed earlier, the software application 114 can be downloaded by the customer 106 from, for example, a website operated by the self-storage manager 108, the Apple iTunes App Store®, the Android App Store®, and the like, or the software application 114 can be a website accessed via a URL using a browser on the mobile device 112.

In an embodiment, the notice can instruct the user to launch the software application 114 on their mobile device 112, can instruct the user to visit a URL using a browser on their mobile device 112, and/or can include a scannable code which automatically launches the software application 114 or a URL on the mobile device 112. In another embodiment, the notice can instruct the user to place a telephone call or send a message, such as a SMS, MMS, or email, to the self-storage facility.

In another embodiment, the notice can be sent directly to the customer 106, such as via text, SMS, MMS, email, or secure message through the software application. The notice can include a URL or other mechanism to launch the software application 114 on the mobile device 112. In addition, the notice can be mailed via physical mail to the customer’s address on file.

In yet another embodiment, the notice can be a telephone call from the management site 118, instructing the customer 106 to access the software application 114.

In step 804, the customer 106 is prompted to enter their credentials, such as a login and password, or other indicia that verifies the customer's identity. The credentials may also be supplied via biometric means, such as with fingerprint, iris, voice, face, and gesture recognition means incorporated into the mobile device 112 and/or software application 114. In another embodiment, the credential can include a one-time or limited use password provided by a secure token, such as a RSA SecurID®.

In step 806, the management site 118 determines if the credentials are valid. If not, the process returns to step 804, and the customer 106 is prompted to re-enter their credentials. If the credentials are deemed valid, then in step 808, the management site 118 determines if the customer's account is indeed delinquent. If the customer 106 no longer has a past due balance, then the customer 106 is prompted to enter the identifier from the over-lock 110 in step 810. This scenario may occur, for example, if a customer 106 makes a payment to rectify a past due balance from a remote location, such as their home or work, and then subsequently arrives at the self-storage facility to discover a previously placed over-lock 110.

If the customer 106 still has a past due balance, then the customer 106 is prompted to pay their past due balance in step 812. In an embodiment, the customer 106 can make payments to the self-storage facility via a credit card, debit card, automated clearing house (ACH) transfer, and wire transfer. The software application 114 may allow the user to store a payment method on file, such as a stored credit card, or a linked bank account.

In addition, the self-storage facility can accept payment via third-party payment processing systems, such as PayPal®, Stripe®, Apple Pay®, Android Pay®, Square®, Amazon Payments®, Viewpost®, and other similar platforms. Such payment processing systems can be integrated within the software application 114.

In yet another embodiment, the self-storage facility can accept payment via cryptographic and digital currencies, such as, but not limited to Bitcoin, Ethereum, Litecoin, and Nano.

In another embodiment, the customer 106 can visit the manager self-storage and/or the remote management site 118 and pay the past due balance in-person.

The process then returns to step 808, where the management site 118 determines if the customer 106 still has a past due balance on their account. If there is no past due balance, then the customer 106 is prompted to enter the identifier from the over-lock 110 in step 810. If the customer 106 still has a past due balance, then the process returns to step 812 where the customer 106 is prompted to pay their past due balance.

In step 814, the management site 118 transmits the unlock code to the customer 106, who can then remove the over-lock 110 from their storage unit 104.

Figure 9:
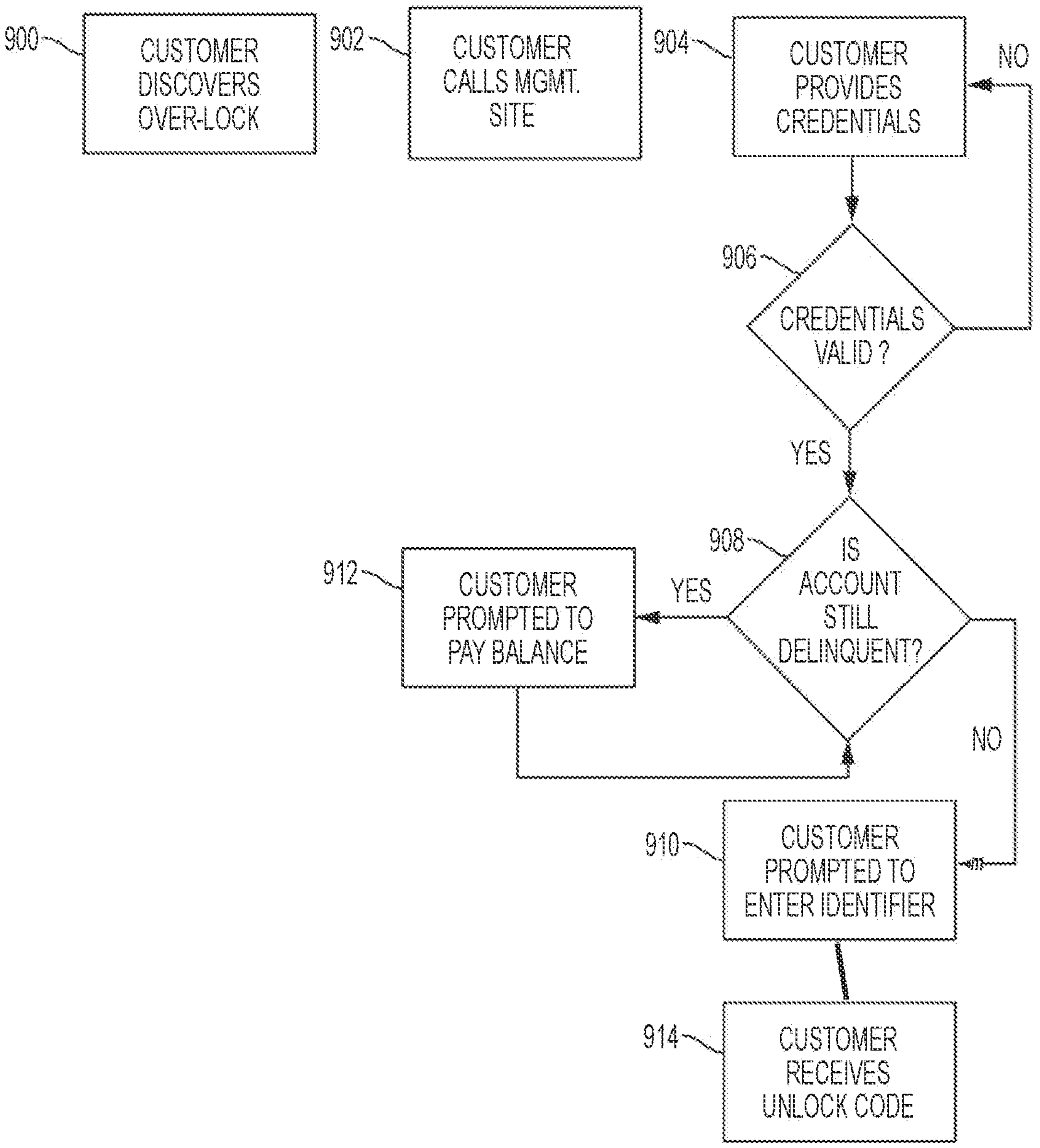
FIG. 9 is a flowchart illustrating the steps taken by a customer to retrieve an unlock code via a telephone call according to an embodiment of the invention.

FIG. 9 is a flowchart illustrating the steps taken by a customer to retrieve an unlock code via a telephone call according to an embodiment of the invention. In step 900, the customer 106 discovers that their storage unit 104 has been over-locked.

In step 902, the customer 106 follows instructions on a notice from the self-storage facility to call the management site 118 in order to retrieve an unlock code for the over-lock 110. In an embodiment, the management site 118 can include a self-storage manager 108, call center, representative, or third-party answering service. In another embodiment, the customer 106 can send a message to the management site 118, such as via text, SMS, MMS, email, or secure message through the software application in order to schedule a call from the management site 118.

In step 904, the management site 118 requests the customer 106 to provide credentials, as described above.

In step 906, the management site 118 determines if the credentials are valid. If not, the process returns to step 904 and the management site 118 requests the customer 106 to provide their credentials again. If the credentials are deemed valid, then in step 908, the management site 118 determines if the customer's account is indeed delinquent. If the customer 106 no longer has a past due balance, then the customer 106 is prompted to enter the identifier from the over-lock 110 in step 910. The customer 106 can verbally provide the identifier, enter the identifier via their alphanumeric keypad on their mobile device 112, or scan identifier and transmit it to the management site 118 using their mobile device 112.

If the customer 106 still has a past due balance, then the customer 106 is prompted to pay their past due balance in step 912.

The process then returns to step 908, Where the management site 118 determines if the customer 106 still has a past due balance on their account. If there is no past due balance, then the customer 106 is prompted to provide the identifier from the over-lock 110 in step 910. If the customer 106 still has a past due balance, then the process returns to step 912 where the customer 106 is prompted to pay their past due balance.

In step 914, the management site 118 provides the unlock code to the customer 106, who can then remove the over-lock 110 from their storage unit 104.

In an embodiment, the over-lock 110 can include an emergency mode, where emergency personnel, such as first responders, police, firefighters, and emergency medical service providers and request an unlock code. In this embodiment, the emergency personnel can transmit an emergency credential along with the identifier. Upon receipt of the emergency credential by the management site 118, the processing unit 120 foregoes credential verification and proceeds with decrypting the unlock code.

In yet another embodiment, the over-lock 110 is an electronic lock that accepts a combination input via digital keys or a touchscreen. The customer 106 can be provided with a secure token that provides a one-time or limited use password, such as the RSA SecurID®. In the event of a delinquent past due balance, the management site 118 can remotely disable the secure token until the customer 106 makes a payment of the past due balance.

In another embodiment, the entire process of retrieving an unlock code by the customer 106 can be automated. For example, the management site 118 can include an automated attendant that verifies the identity of the customer 106 via the means described above, receives the identifier from the customer 106, and provides the unlock code to the customer 106. The process can also occur in an automated fashion without human intervention from the self-storage facility or management site 118 via the kiosk 500.

Figure 10:
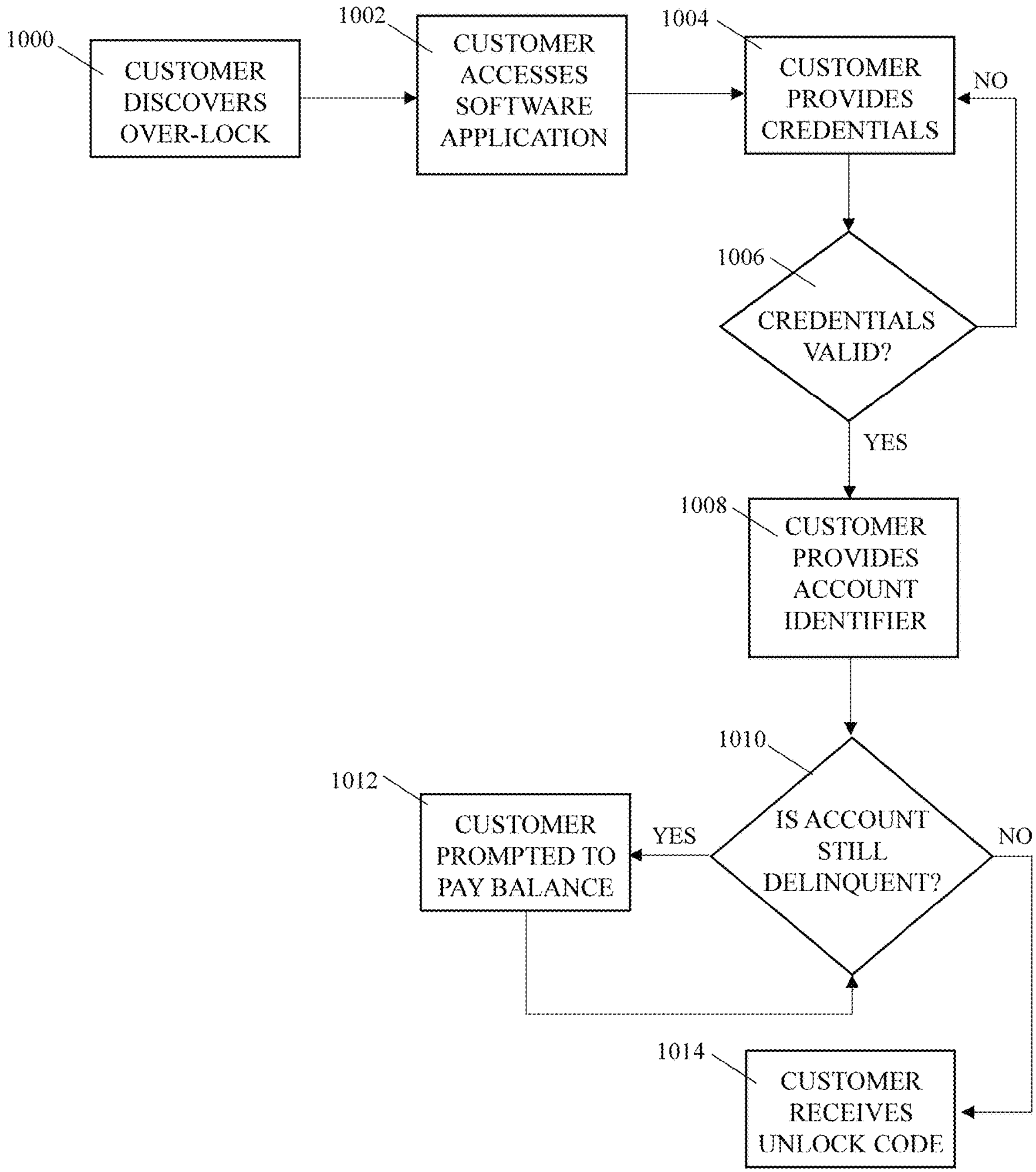
FIG. 10 is a flowchart illustrating the steps taken by a customer to retrieve an unlock code using the software application and only an account identifier according to an embodiment of the invention.

FIG. 10 is a flowchart illustrating the steps taken by a customer to retrieve an unlock code using the software application and a customer account identifier according to an embodiment of the invention.

In step 1000, the customer 106 discovers that their storage unit 104 has been over-locked.

In step 1002, the customer 106 follows instructions on a notice from the self-storage facility to access the software application 114 and/or website in order to retrieve an unlock code for the over-lock 110 as described herein.

In step 1004, the customer 106 is prompted to enter their credentials, such as the customer's mobile device number, email address, login, password, phone number, account number, personal identification number (PIN), name, driver's license number, social security number, birthdate, and/or a unique account identification code. The over-lock identifier and/or unlock code is previously associated with the storage unit and/or customer.

The unlock code and/or over-lock identifier can be previously associated with the storage unit and/or the customer. This association can be in the form of a mapping table in the database 122. In one embodiment, at the time of placing the over-lock on the storage unit 104, the unlock code for the over-lock is mapped to the storage unit 104 and/or customer record in the database 122. During a subsequent lookup, the storage unit 104 or customer information is required by the processing unit 120 to retrieve the unlock code. In this embodiment, the unlock code and storage unit 104 and/or customer information may or may not be encrypted.

In another embodiment, the over-lock identifier is generated using an encryption technique using the unlock code. The over-lock identifier can then be associated with an over-lock, and/or can be associated with the storage unit 104 and/or customer. In the event that the over-lock identifier is associated with the storage unit 104 and/or customer, then the storage unit 104 and/or customer are also associated with the corresponding over-lock in the database 122. During a subsequent lookup, the over-lock identifier is required by the processing unit 120 in order to decrypt the unlock code.

In step 1006, the management site 118 determines if the credentials are valid. If not, the process returns to step 1004, and the customer 106 is prompted to re-enter their credentials. If the credentials are deemed valid, then in step 1008, the customer is prompted to enter an account identifier. In this embodiment, the management site 118 receives the customer account identifier, and the management site 118 does not necessarily receive a serial number or unique identifier of the over-lock itself. The account identifier can include, but is not limited to, a storage unit/unit number, an account number, and any other identifier that associated the customer with a specific account or storage unit or units. The management site 118 performs a look-up function using the account identifier. The look-up function correlates the account identifier with the storage unit 104, the over-lock identifier and/or the unlock code, as well as a customer account.

In step 1010, based on the look-up, the management site 118 determines if the customer account is delinquent. If the customer 106 still has a past due balance, then the customer 106 is prompted to pay their past due balance in step 1012 as described herein. If there is no past due balance, then the management site 118 transmits the unlock code to the customer 106 in step 1014, who can then remove the over-lock 110 from their storage unit 104.

If the customer 106 still has a past due balance in step 1010, then the customer 106 is prompted to pay their past due balance in step 1012 by any of the means described herein.

Figure 11A:
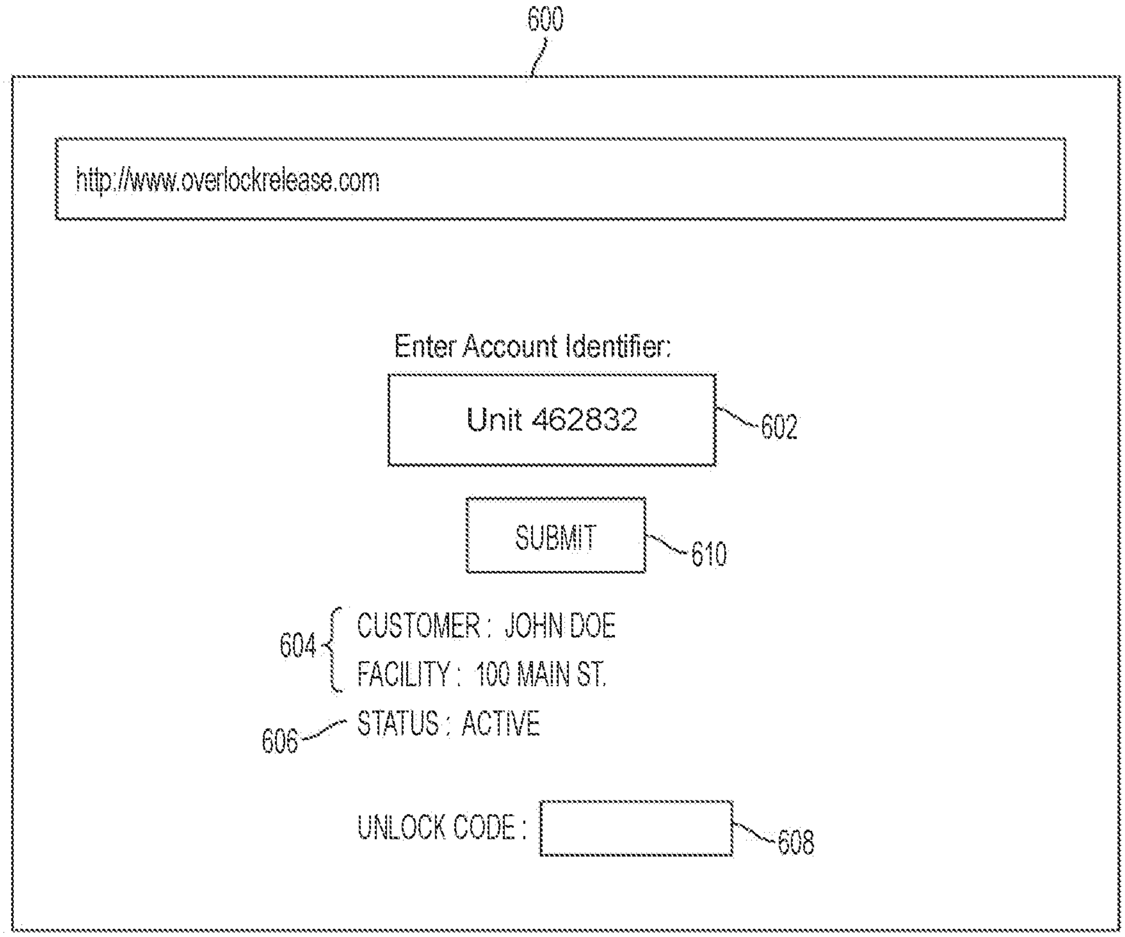
FIG. 11A is an illustration of an over-lock release interface that receives an account identifier for a software application according to an embodiment of the invention.

FIG. 11A is an illustration of an over-lock release interface that receives an account identifier for a software application according to an embodiment of the invention. The unlock interface 600 can be displayed on the mobile device 112 once the customer 106 activates the software application 114. The interface 600 is displayed after the customer 106 has entered their credentials and has been verified by the management site 118. The unlock interface 600 allows the customer 106 to enter a customer account identifier, such as, for example, their storage unit number, at input box 602. The unlock interface 600 can also display information 604 such as the customer name and facility name after receiving the customer account identifier, and customer status 606. The customer status 606 can be either "current" or "active" (i.e., paid in full and in good standing), or "delinquent" (i.e., having a past due balance). In an embodiment, the customer status 606 can include be "pending", indicating that a payment has been submitted, but not yet processed, such as in the case of wire transfers or digital currency payments which typically require a delay in settlement.

In an embodiment, the unlock code 608 is displayed after the customer 106 transmits the identifier by selecting the "SUBMIT" button 610, and after the processing unit 120 successfully decrypts the unlock code. If an over-lock identifier was previously associated with the storage unit, the processing unit 120 can perform a lookup of the over-lock identifier and perform the decryption step, as described previously herein. In the event that the unlock code was previously associated with the storage unit, then the processing unit 120 performs a lookup of the storage unit to retrieve the associated unlock code.

Figure 11B:
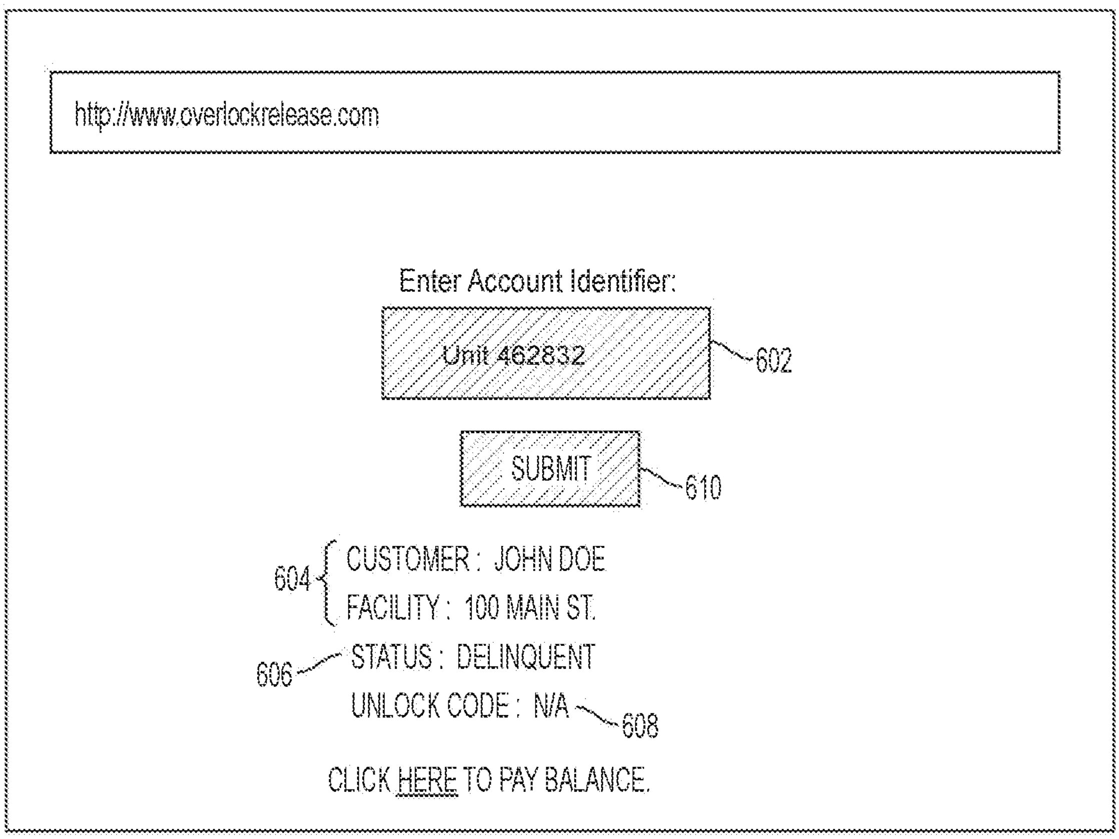
FIG. 11B is an illustration of an over-lock release interface that receives an account identifier for a software application according to an embodiment of the invention.

FIG. 11B is an illustration of an over-lock release interface that receives an account identifier for a software application according to an embodiment of the invention. In the event that the customer 106 has not made payment on a delinquent past due balance, and still attempts to retrieve the unlock code, the customer status 606 will he listed as "Delinquent". In addition, the "SUBMIT" button 610 will be greyed our or inactive, so that the customer 106 cannot submit the identifier. In another embodiment, the customer 106 may not even reach the unlock interface 600, and rather, is directed toward a billing webpage upon launching the software application 114. where they can make a payment to rectify their delinquent account (not shown).

Figure 12:
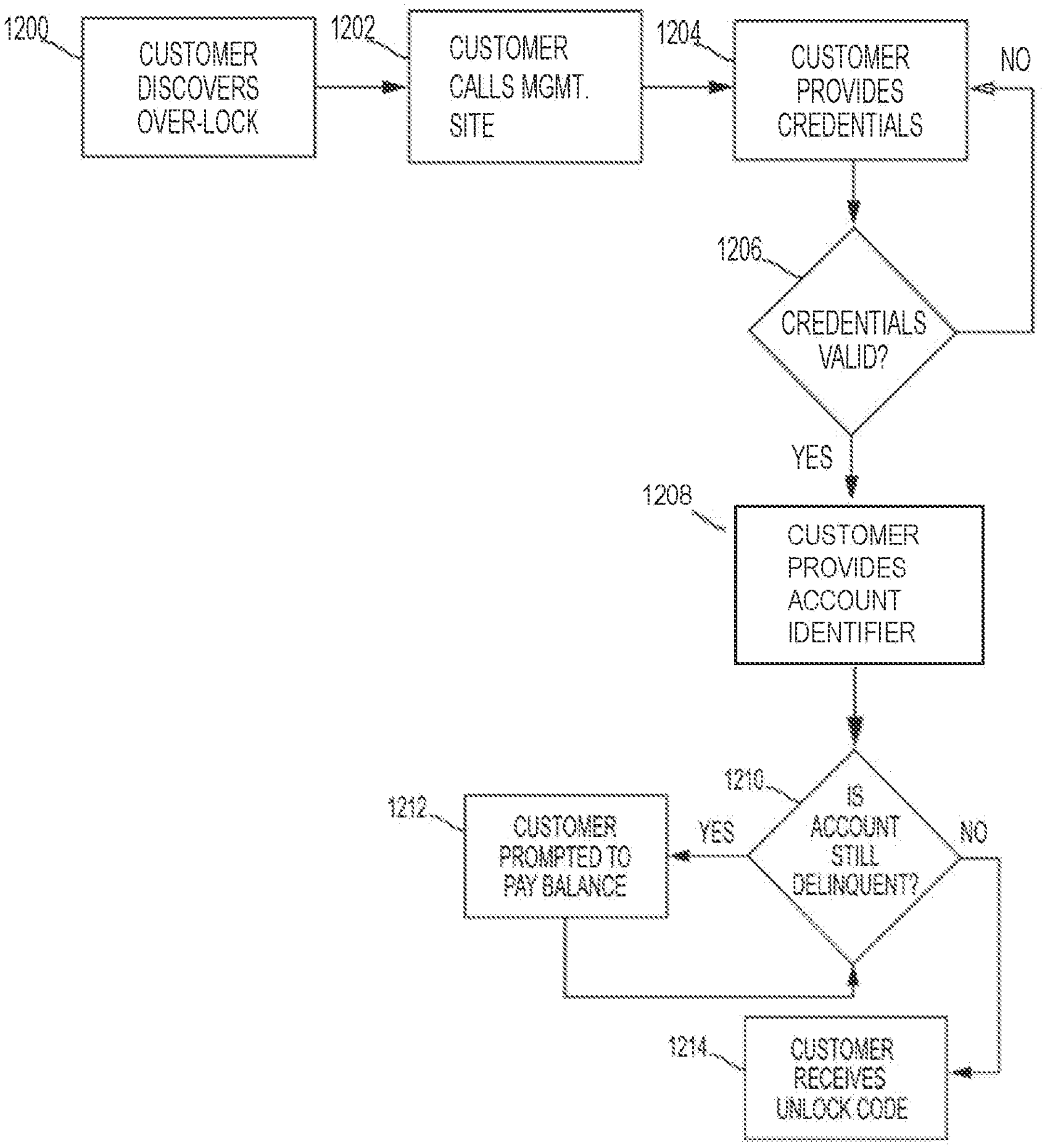
FIG. 12 is a flowchart illustrating the steps taken by a customer to retrieve an unlock code via a telephone call using only an account identifier according to an embodiment of the invention.

FIG. 12 is a flowchart illustrating the steps taken by a customer to retrieve an unlock code via a telephone call using only an account identifier according to an embodiment of the invention. In step 1200, the customer 106 discovers that their storage unit 104 has been over-locked.

In step 1202, the customer 106 follows instructions on a notice from the self-storage facility to call the management site 118 in order to retrieve an unlock code for the over-lock 110. In an embodiment, the management site 118 can include a self-storage manager 108, call center, representative, or third-party answering service. In another embodiment, the customer 106 can send a message to the management site 118, such as via text, SMS, MMS, email, or secure message through the software application in order to schedule a call from the management site 118.

In step 1204, the management site 118 requests the customer 106 to provide their credentials, as described herein.

In step 1206, the management site 118 determines if the credentials are valid. If not, the process returns to step 1204, and the customer 106 is prompted to re-provide their credentials. If the credentials are deemed valid, then in step 1208, the customer is prompted to enter an account identifier. In this embodiment, the management site 18 receives the customer account identifier, and the management site 118 does not necessarily receive a serial number or unique identifier of the over-lock itself. The account identifier can include, but is not limited to, a storage unit/unit number, an account number, and any other identifier that associated the customer with a specific account or storage unit or units. The management site 118 performs a look-up function using the account identifier. The look-up function correlates the account identifier with the storage unit 104, the over-lock identifier, and/or the unlock code, as well as a customer account. In an embodiment, multiple customer accounts, or multiple individuals associated with a customer account, can be associated with the storage unit 104, the over-lock identifier, and/or the unlock code.

If there is no past due balance, then the management site 118 transmits the unlock code to the customer 106 in step 1214, who can then remove the over-lock 110 from their storage unit 104.

If the customer 106 still has a past due balance, then the customer 106 is prompted to pay their past due balance in step 1212. The process then returns to step 1210, where the management site 118 determines if the customer 106 still has a past due balance on their account.

Figure 13:
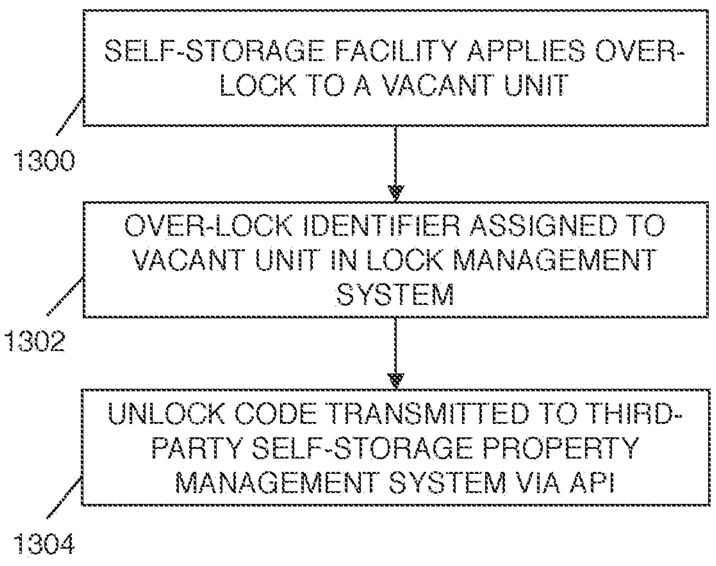
FIG. 13 is a flowchart illustrating the steps taken to apply an over-lock to a vacant storage unit according to an embodiment of the invention.

FIG. 13 is a flowchart illustrating the steps taken to apply an over-lock to a vacant storage unit. In step 1300, the self-storage facility applies an over-lock to a vacant storage unit. In step 1302, the over-lock identifier is assigned, mapped, associated with, or linked to the specific vacant storage unit in a database coupled to a lock management system operated by the management site. In an embodiment, the over-lock identifier and/or the unlock code for the over-lock are mapped to the specific vacant storage unit in the database.

As discussed above, the management site can be separate from the self-storage facility, and can be owned and/or operated by an entity different from the self-storage facility. In an embodiment, the self-storage facility is a customer of the management site, and purchases a subscription, license, or the like to the lock management system, from the management site.

In step 1304, the unlock code is transmitted from the lock management system to a third-party property management system via an application programming interface (API). In an embodiment, the third-party property management system is owned and/or operated by an entity different from the management site and/or the self-storage facility. The third-party property management system can be, but is not limited to, software offered by, for example, storEDGE®, SiteLink®, Storage Commander®, QuikStor®, 6Storage®, Tredds Self Storage®, Easy Storage Solutions®, Convoyant ResNexus®, and the like.

The API allows the lock management system to communicate with the third-party property management system, and allows either unidirectional or bidirectional transmission of data between the two systems.

In an embodiment, the lock management system is a completely separate and distinct software program from the third-party property management system. The lock management system and the third-party property management system can be located on different servers, and only coupled via the API, and not by any direct, physical network communication links. Furthermore, the lock management system can integrate with various different third-party property management systems via multiple APIs, such that a single lock management system can communicate with multiple different, disparate third-party property management systems.

Figure 14:
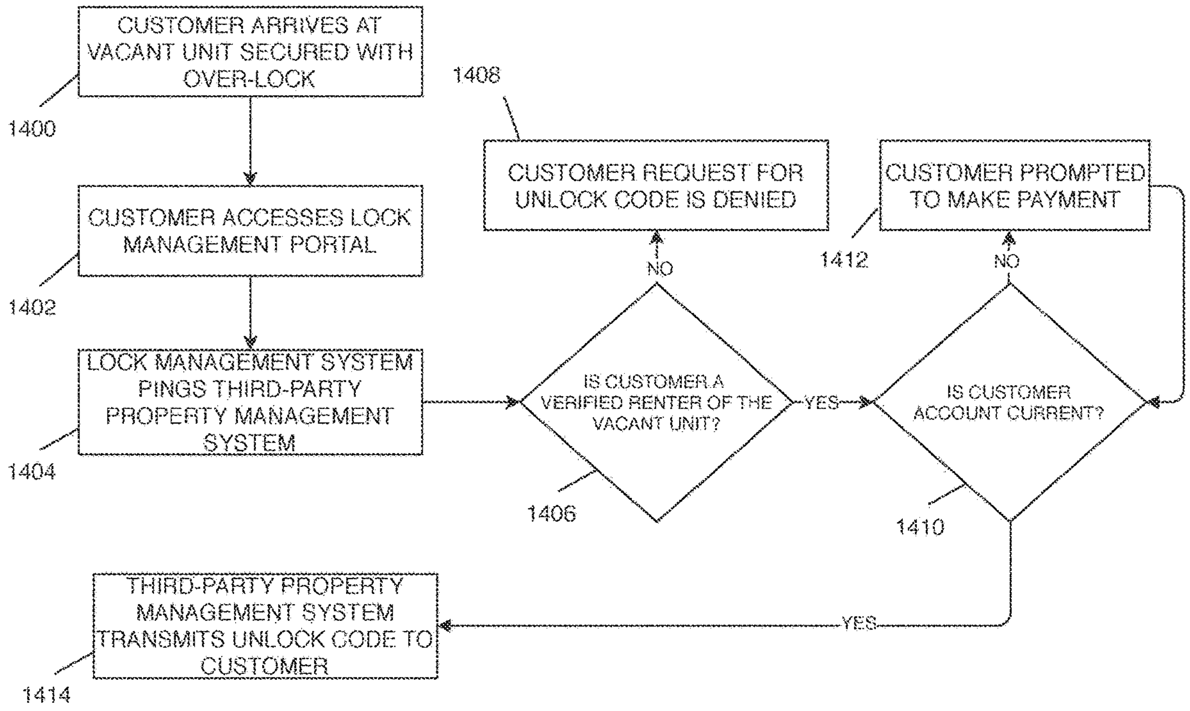
FIG. 14 is a flowchart illustrating the steps taken to retrieve an unlock code from a third-party property management system for an over-lock secured to a vacant storage unit according to an embodiment of the invention.

FIG. 14 is a flowchart illustrating the steps taken to retrieve an unlock code from a third-party property management system for an over-lock secured to a vacant storage unit. In step 1400, a customer arrives at a vacant storage unit that is secured with an over-lock. In an embodiment, the storage unit or over-lock includes a notice that has instructions for the customer on how to request an unlock code for the over-lock.

The notice can instruct the user to launch a software application on their mobile device, and/or can instruct the user to visit a portal for the lock management system using, for example, a URL on a browser on their mobile or computing device, and/or can include a scannable code which automatically launches the software application or a URL on their mobile device. In another embodiment, the notice can instruct the user to place a telephone call or send a message, such as a SMS, MMS, or email, to the self-storage facility or management site.

In another embodiment, the notice can be sent directly to the customer via text, SMS, MMS, email, or secure message through the software application, such that the customer does not physically have to visit the vacant storage unit to view the notice. The notice can include a URL or other mechanism to launch the software application on their mobile device. In addition, the notice can be mailed via physical mail to the customer's address on file.

In step 1402, the customer accesses the lock management system portal, which is described in more detail above and depicted in FIGS. 11A and 11B. Further in step 1402, the customer is prompted to enter their credentials, such as the customer's mobile device number, email address, login, password, phone number, account number, personal identification number (PIN), name, driver's license number, social security number, birthdate, and/or a unique account identification code.

In step 1404, the lock management system transmits the customer credential(s) and a storage unit identifier and/or over-lock identifier to the third-party property management system via the API. This step does not require human or manual intervention or action; the lock management system automatically and seamlessly transmits the customer credential(s) after receiving them from the customer via the portal.

In step 1406, the third-party property management system determines if the customer is truly a verified renter of that specific storage unit. If not, the customer request for the unlock code is denied in step 1408.

If, however the customer is a verified renter of that specific storage unit, the process continues to step 1410 where the third-party property management system determines if the customer's account is delinquent. If the customer's account is not current and there is an outstanding past due balance, the process continues to step 1412 where the customer is prompted to make a payment to rectify their past due balance, as discussed in more detail above. The process can then return to step 1410 where the customer's account status is once again verified.

If the customer's account is current and there is no outstanding past due balance, then the process continues to step 1414 where the third-party property management system transmits the unlock code to the customer. In an embodiment, the unlock code can be transmitted to the customer via text, SMS, MMS, email, secure message through the software application, displayed on the customer's browser, or via an automated telephone call. Again, this step does not require human or manual intervention or action on the part of the self-storage facility, management site, or third-party property management system provider.

Figure 15:
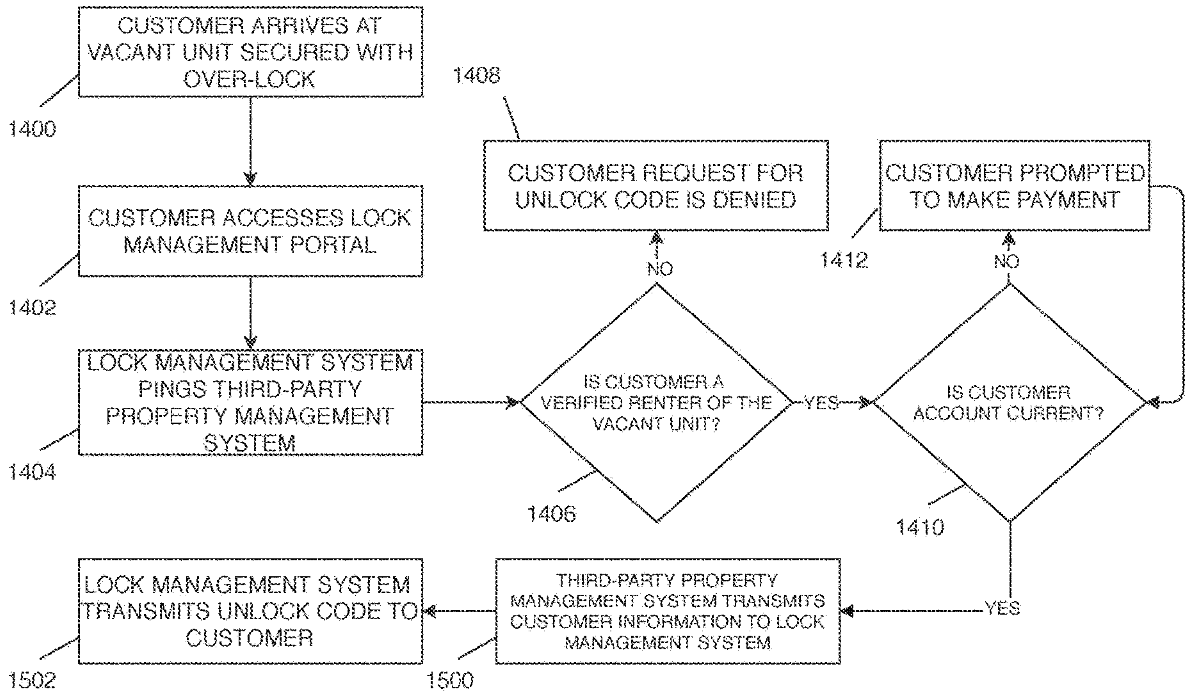
FIG. 15 is a flowchart illustrating the steps taken to retrieve an unlock code from a third-party property management system for an over-lock secured to a vacant storage unit according to an embodiment of the invention.

FIG. 15 is a flowchart illustrating the steps taken to retrieve an unlock code from a lock management system for an over-lock secured to a vacant storage unit. In this embodiment, the process is similar to the steps described above for FIG. 14. However, in step 1500, the third-party property management system can transmit the customer's contact information, such as their mobile phone number, email address, and the like, to the lock management system via the APL In step 1502, the lock management system transmits the unlock code to the customer. In an embodiment, the unlock code can be transmitted to the customer via text, SMS, MMS, email, secure message through the software application, displayed on the customer's browser, or via an automated telephone call. Again, this step does not require human or manual intervention or action on the part of the self-storage facility, management site, or third-party property management system provider.

In an alternative embodiment, in lieu of either steps 1414 of FIG. 14 or 1502 of FIG. 15, the unlock code can be transmitted to the self-storage facility manager or operator, or to a human operator at the management site, who can be then provide the unlock code to the customer via a phone call or in person, or via text, SMS, MMS, email, or secure message through the software application.

In an embodiment, the lock management system is executed on the computing hardware and software 119, and operated by the management site 118. In another embodiment, the lock management system can be a cloud-based system, and located on a server remote from the management site 118, such as on a server or distributed server environment provided by Amazon Web Services® or the like.

Figure 16:
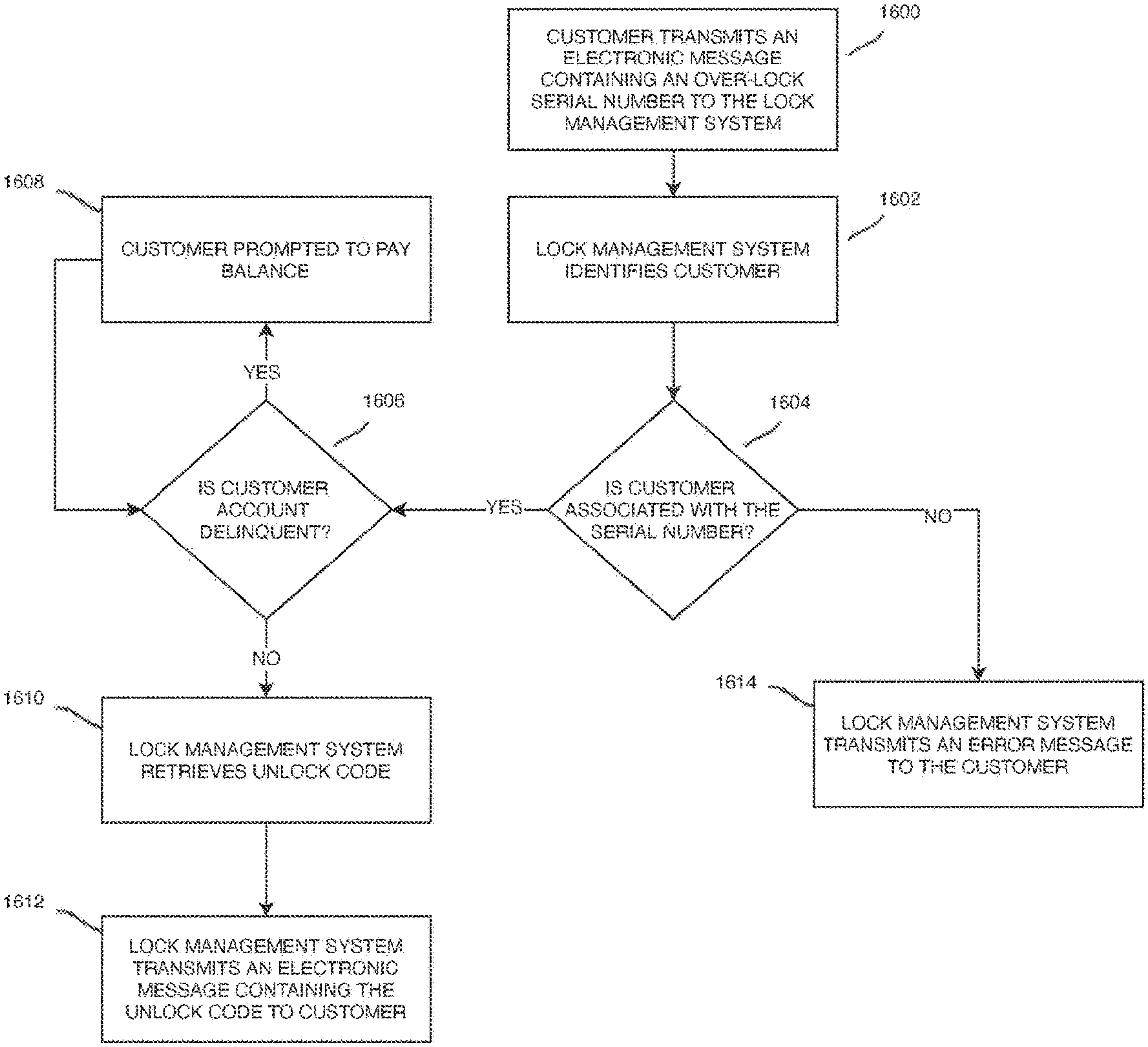
FIG. 16 is a flowchart illustrating the steps taken retrieve an unlock code from the lock management system via electronic messaging using a serial number, according to an embodiment of the invention.

FIG. 16 is a flowchart illustrating the steps taken to retrieve an unlock code from the lock management system via electronic messaging using a serial number, according to an embodiment of the invention. In step 1600, the customer 106 transmits an electronic message containing an over-lock identifier, such as a serial number, to the lock management system. In an embodiment, the customer 106 uses their mobile device 112 to send a text message containing the serial number to the lock management system. The electronic message may be in any form, and may be a text message, SMS, MMS, email, or secure message through the software application. In an embodiment, the over-lock identifier can be a serial number, unique code, barcode, QR code, or other unique indicia.

In yet another embodiment, the customer 106 can take a photograph or image of the over-lock identifier, and transmit the image to the lock management system via their mobile device 112. Upon receipt, image analysis is performed by the lock management system and the over-lock identifier is extracted from the photograph.

In yet another embodiment, the over-lock identifier is contained within a QR code. When the customer 106 scans the QR code with their mobile device 112, the software application on the mobile device 112 is caused to automatically execute a routine that transmits the QR code and customer credentials to the lock management system.

In step 1602, the lock management system receives the electronic message, and identifies the customer 106. In an embodiment, the lock management system determines the identity of the customer 106 using a telephone number caller identification system (i.e., a "caller ID" system). In another embodiment, if the electronic message is transmitted using a. secure message through the software application, the credentials of the customer 106 are transmitted to the lock management system along with, or as part of, the secure message. Once the customer 106 is identified, the lock management system retrieves customer information associated with the customer 106.

In another embodiment, once the lock management system receives the electronic message containing the serial number, the lock management system transmits a message to the customer 106 requesting that the customer 106 provides their account credentials, such as a login or username, or other indicia that verifies the customer's identify. Upon receiving the credentials from the customer 106, the lock management system can transmit another message to the customer 106 requesting the password for the account. If the customer 106 successfully responds with a valid password, the lock management system then proceeds to step 1604.

If, however, in step 1602, the customer does not respond with a valid password, or does not provide valid credentials, the lock management system transmits an electronic message containing an error message to the customer 106. In an embodiment, the electronic message can include a hyperlink that allows the customer 106 to register for, or purchase, access to the location.

In step 1604, after the customer 106 is identified, the lock management system determines if the customer 106 is associated with the serial number in the database 122. In an embodiment, the lock management system performs a look-up function using the customer information, such as the customer name, account identifier, PIN, driver's license number, social security number, birthday, and/or a unique account identification code.

If the lock management system determines that the customer 106 has previously been associated with the serial number, then the process continues to step 1606.

In another embodiment, the lock management system first identifies the over-lock that is associated with the serial number, and then determines if the customer 106 has previously been associated with that over-lock.

In step 1606, the lock management system determines if the customer 106 has a delinquent account. If the customer 106 has a past due balance, then the customer 106 is prompted to pay their past due balance in step 1608 as described herein with regards to step 1012 in FIG. 10. The process then returns to step 1606 where the lock management system again determines if the customer 106 has a delinquent balance.

If, in step 1606, the lock management system determines that the customer 106 does not have a delinquent account or past due balance, then the lock management system retrieves an unlock code associated with the over-lock and/or serial number in step 1610, and the lock management system transmits an electronic message containing the unlock code to the customer 106 in step 1612. In an embodiment, the lock-management system transmits the electronic message to the mobile device 112 via text, SMS, MMS, email, or secure message through the software application.

In another embodiment, the lock management system can place an automated telephone call to the mobile device 112, and the unlock code is read to the customer 106 via a text-to-speech function. Alternatively, human personnel, such as the self-storage manager 108 at the management site 118, or a call center employee, is prompted to call the mobile device 112 and provide the unlock code to the customer 106.

If, however, in step 1604, the lock management system determines that the customer 106 is not associated with the serial number, then in step 1614, the lock management system transmits an electronic message containing an error message to the customer 106. In an embodiment, the electronic message can include a hyperlink that allows the customer 106 to register for, or purchase, access to the location.

Figure 17:
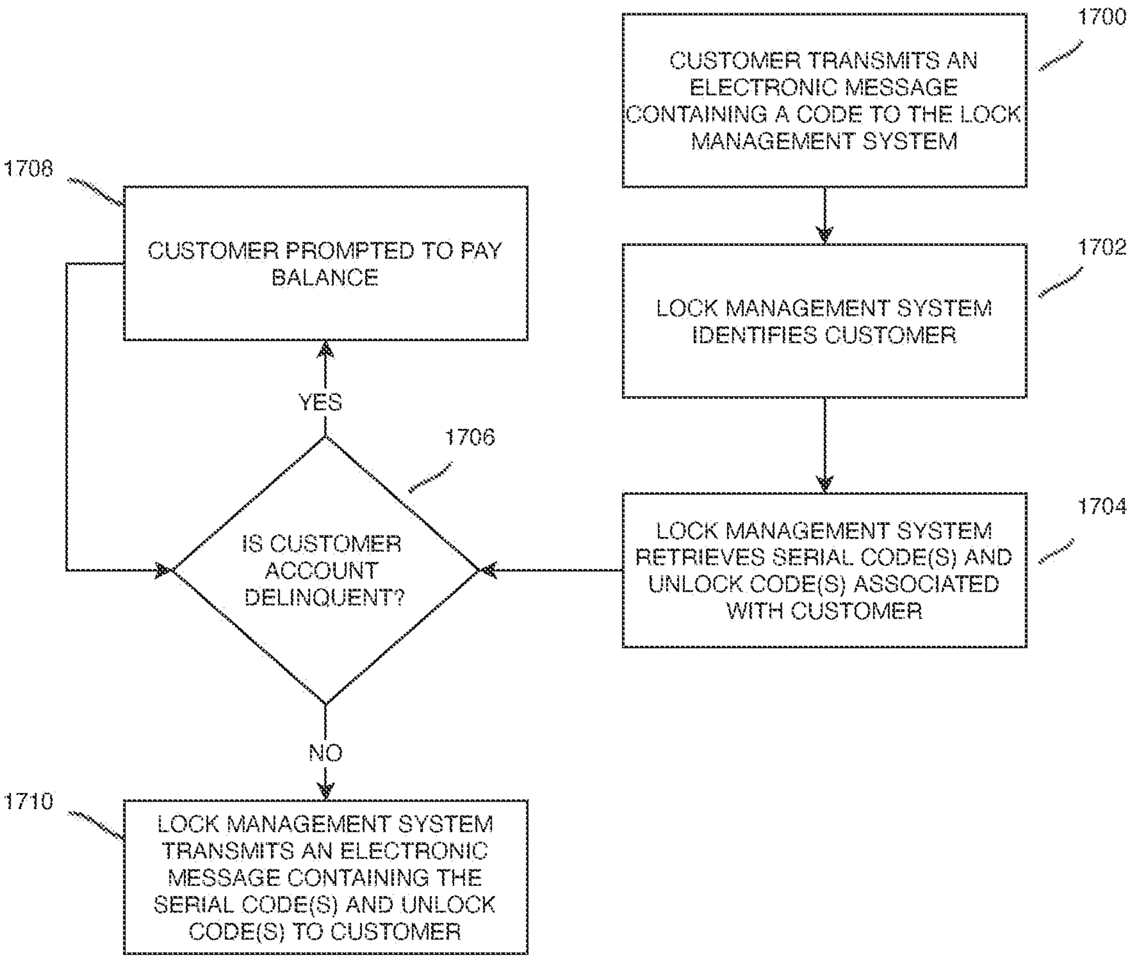
FIG. 17 is a flowchart illustrating the steps taken to retrieve an unlock code from the lock management system via electronic messaging using an alphanumeric code, according to an embodiment of the invention.

FIG. 17 is a flowchart illustrating the steps to retrieve an unlock code from the lock management system via electronic messaging using an alphanumeric code, according to an embodiment of the invention. In step 1700, the customer 106 transmits an electronic message containing an alphanumeric code to the lock management system. In an embodiment, the alphanumeric code can consist of all letters, all numbers, all emojis, or a combination of numbers, letters, and or emojis. In an embodiment, the customer 106 uses their mobile device 112 to send a text message containing the alphanumeric code to the lock management system. The electronic message may be in any form, and may be a text message. SMS, MMS, email, or secure message through the software application.

For example, the customer 106 can text the alphanumeric code "CODE" to the lock management system. In an embodiment, the alphanumeric code can be pre-determined by the lock management system, or alternatively, the alphanumeric code can be pre-determined by the customer 106. In yet another embodiment, the alphanumeric code has a time expiration, such that after a period of time, such as, for example, 30 days, the alphanumeric code is reset by the lock management system.

In another embodiment, the customer 106 can speak the alphanumeric code (if it does not contain emojis), and the mobile device 112 can generate a voice-to-text message that is transmitted to the lock management system in the form of an electronic message.

In step 1702, the lock management system receives the electronic message, and identifies the customer 106. In an embodiment, the lock management system determines the identity of the customer 106 using a caller ID system, as described herein with regards to step 1602 in FIG. 16.

In step 1704, after the customer 106 is identified using the caller ID system, the lock management system retrieves all of the serial numbers and unlock codes associated with the customer 106. In this embodiment, the customer 106 may be associated with multiple over-locks.

If the customer 106 is associated with multiple over-locks, the customer 106 can associate certain individuals, such as personnel of the customer 106, friends, family members, and the like, with certain over-locks. In this manner, the customer 106 can provide selective access to unlock codes to certain individuals for specific over-locks. Each individual can have a unique alphanumeric code which is associated with the specific over-locks that the customer 106 has granted them access to. Alternatively, every customer or customer personnel can use the same alphanumeric code, and each individual is then authenticated as described herein with regards to step 1702.

In step 1706, the lock management system determines if the customer 106 has a delinquent account. If the customer 106 has a past due balance, then the customer 106 is prompted to pay their past due balance in step 1708 as described herein with regards to step 1012 in FIG. 10. The process then returns to step 1706 where the lock management system again determines if the customer 106 has a delinquent balance.

If, in step 1706, the lock management system determines that the customer 106 does not have a delinquent account or a past due balance, then the lock management system transmits an electronic message containing the serial number (s) and respective unlock code(s) to the customer 106 in step 1710. In an embodiment, the lock management system transmits the electronic message to the mobile device 112 via text, SMS, MMS, email, or secure message through the software application.

In an embodiment, if the customer 106 is associated with multiple over-locks, then the lock management system can transmit a single electronic message to the customer 106 that contains each serial number and unlock code pair for each over-lock. Alternatively, the lock management system can transmit a separate electronic message to the customer 106 for each serial number and unlock code pair (i.e., a separate electronic message for each over-lock is transmitted to the customer 106).

In yet another embodiment, if the customer 106 is associated with multiple over-locks, the lock management system can transmit a list of the serial numbers for these over-locks, and the customer 106 can select which serial number(s) it wishes to retrieve the unlock code(s) for.

In yet another embodiment, the alphanumeric code can be an identifier for a specific over-lock location. For example, the over-lock can be associated with a specific physical location. In an exemplary embodiment, the customer 106 can text the identifier, such as "Al I", which can correspond to the location "Server Closet Al I", to the lock management system in step 1700. The process continues as described above, and the lock management system in step 1704 determines if a serial number is in fact associated with this location. If a serial number is associated with the location, then the respective unlock code is retrieved by the lock management system from the database 122. The process continues, and in step 1706, the lock management system transmits the unlock code to the customer 106.

The identifier to the specific over-lock location can be pre-determined by the lock management system and/or the customer 106.

Figure 18:
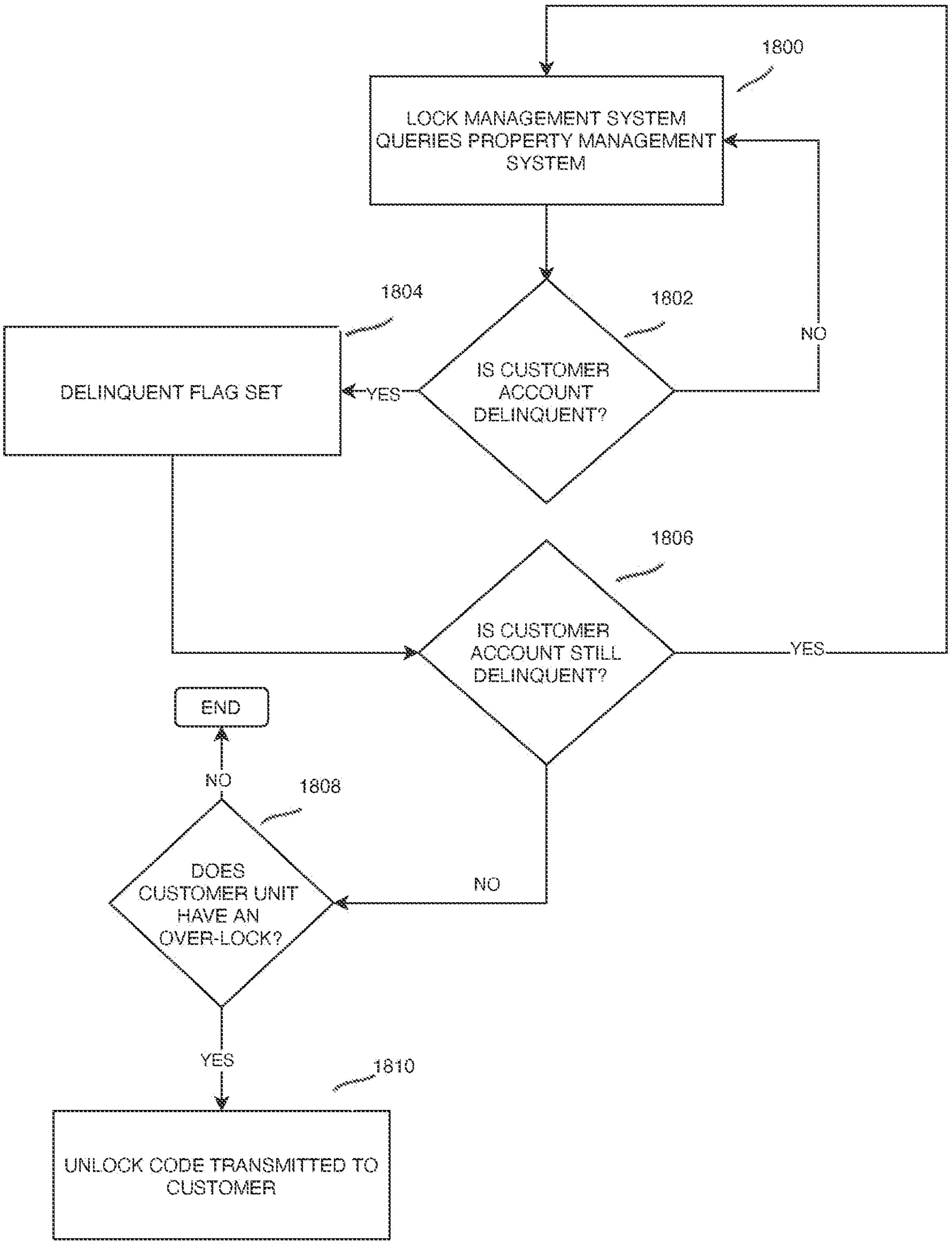
FIG. 18 is a flowchart illustrating the steps of transmitting an unlock code to a customer upon a customer account status changing from delinquent to non-delinquent, according to an embodiment of the invention.

FIG. 18 is a flowchart illustrating the steps of transmitting an unlock code to a customer 106 upon a customer account status changing from delinquent to non-delinquent, according to an embodiment of the invention. In step 1800, the lock management system queries the third-party property management system. As discussed herein, the lock management system can be communicatively coupled to the property management system via an API. In an embodiment, the lock management system queries the property management system to determine if a customer has a delinquent account. This determination can be made in a number of ways known to a person of ordinary skill in the art, and can include, but is not limited to, the use of a delinquent/non-delinquent flag, reading an account ledger balance, a gate access permission, and the like. In an embodiment, the lock management system can transmit a query to the property management system, and the property management system returns a value, message, and the like that indicates whether or not the customer has a delinquent account.

In an embodiment, the lock management system can query the property management system based on pre-determined intervals, such as, for example, every day, once a week, bi-weekly, monthly, quarterly, yearly, and the like. In another embodiment, the lock management system can query the property management system on a random basis. In another embodiment, the lock management system can query the property management system on a constant, or semi-constant, basis, such as, for example, every second, every minute, every hour, and the like.

In yet another embodiment, the lock management system can receive a real-time notification from the property management system when a customer account status changes from delinquent to non-delinquent, and vice-versa.

In step 1802, if the lock management system determines that the customer does not have a delinquent account, then the process returns to step 1800 where the lock management system continues to query the property management system based on the pre-determined interval. If, however, the lock management system determines that the customer has a delinquent account, then in step 1804, the lock management system sets a delinquent flag (or any other type of indicator) in the database 122.

In step 1806, the lock management system again queries the property management system and determines if the customer still has a delinquent account. If the customer no longer has a delinquent account in step 1806, which indicates that the account status has changed from delinquent in step 1802 to non-delinquent in step 1806, then the process continues to step 1808.

If, however, the lock management system determines that the customer still has a delinquent account in step 1806, then the process returns to step 1800.

In step 1808, the lock management system determines if the location associated with the customer's account is secured by an over-lock. If the location is not secured by an over-lock, the process ends. If, however, the location is secured by an over-lock, then in step 1810, the lock management system retrieves the unlock code associated with the particular over-lock, retrieves the contact information for the customer from the property management system, and transmits an electronic message containing the unlock code to the customer. In an embodiment, the contact information can include the customer's mobile phone number, email address, username, unique ID, and the like. In an embodiment, the lock management system transmits the electronic message to the mobile device 112 via text, SMS, MMS, email, or secure message through the software application.

Figure 19:
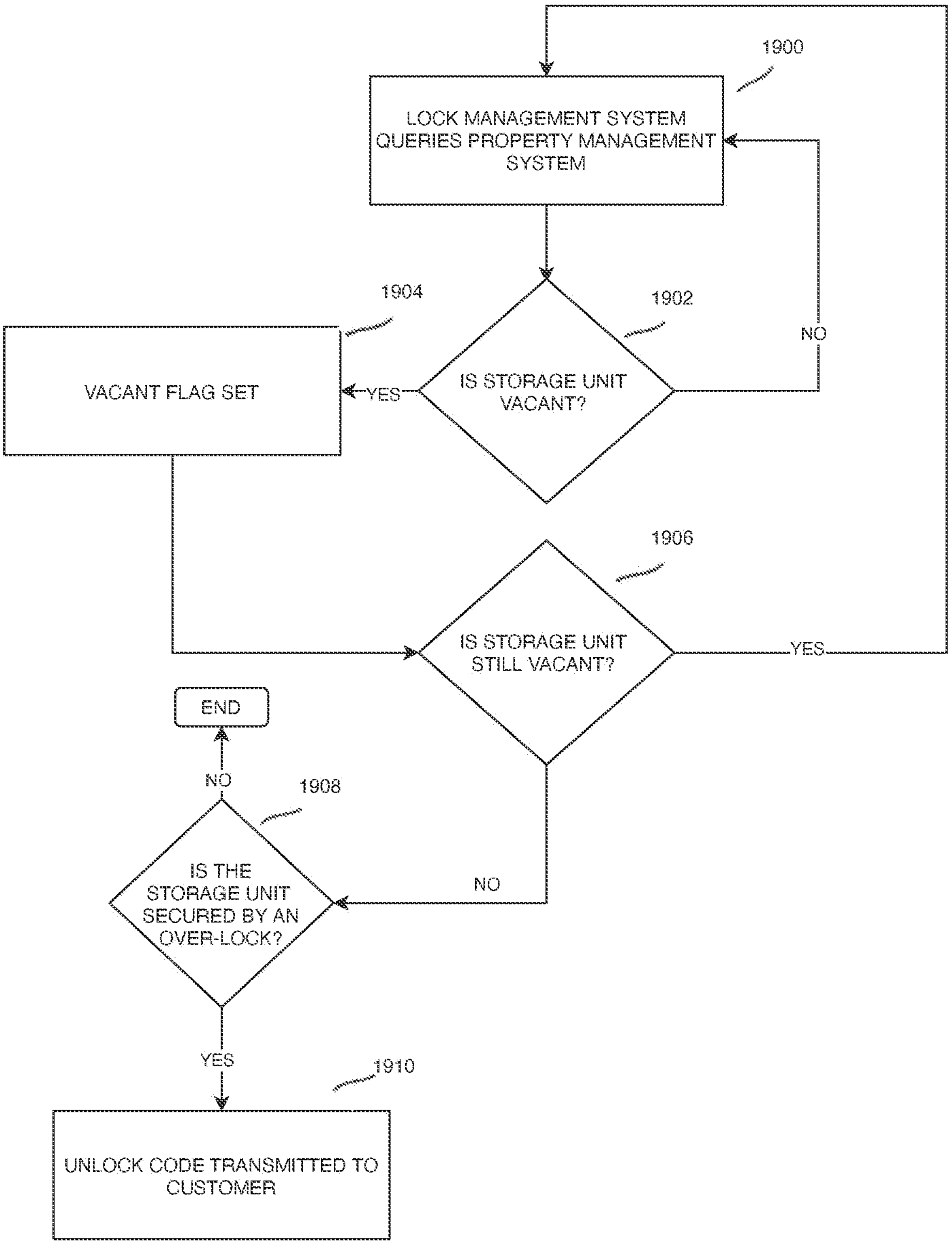
FIG. 19 is a flowchart illustrating the steps of transmitting an unlock code to a customer upon a vacant storage becoming occupied, according to an embodiment of the invention.

FIG. 19 is a flowchart illustrating the steps of transmitting an unlock code to a customer 106 upon a vacant storage becoming occupied, according to an embodiment of the invention. In step 1900, the lock management system queries the third-party property management system. As discussed herein, the lock management system can be communicatively coupled to the property management system via, an API. In an embodiment, the lock management system queries the property management system to determine if a particular location, such as a storage unit, is vacant or occupied. This determination can be made in a number of ways known to a person of ordinary skill in the art, and can include, but is not limited to, the use of a vacant/occupied flag, or another indicator which is stored, maintained, or updated by the property management system. In an embodiment, the lock management system can transmit a query to the property management system, and the property management system returns a value, message, and the like that indicates whether the location is vacant or occupied.

In an embodiment, the lock management system can query the property management system based on pre-determined intervals, such as, for example, every day, once a week, bi-weekly, monthly, quarterly, yearly, and the like. In another embodiment, the lock management system can query the property management system on a random basis. In another embodiment, the lock management system can query the properly management system on a constant, or semi-constant, basis, such as, for example, every second, every minute, every hour, and the like.

In yet another embodiment, the lock management system can receive a real-time notification from the property management system when a location status changes from vacant to occupied, and vice-versa.

In step 1902, if the lock management system determines that the location is not vacant, then the process returns to step 1900 where the lock management system continues to query the property management system based on the predetermined interval. If, however, the lock management system determines that the location is vacant, then in step 1904, the lock management system sets a vacant flag (or any other type of indicator) in the database 122.

In step 1906, the lock management system again queries the property management system and determines if the location is still vacant. If the location is not vacant in step 1906, Which indicates that the location has gone from being vacant in step 1902 to now being occupied in step 1906, then the process continues to step 1908.

If, however, the lock management system determines that the location is still vacant in step 1906, then the process returns to step 1900.

In step 1908, the lock management system determines if the location is secured by an over-lock. If the location is not secured by an over-lock, the process ends. If, however, the location is secured by an over-lock, then in step 1910, the lock management system retrieves the unlock code associated with the particular over-lock, determines the customer associated with the over-lock and/or location, retrieves the contact information for the customer from the property management system, and transmits an electronic message containing the unlock code to the customer. In an embodiment, the contact information can include the customer's mobile phone number, email address, and the like. In an embodiment, the lock management system transmits the electronic message to the mobile device 112 via text, SMS, MMS, email, or secure message through the software application.

Figure 20:
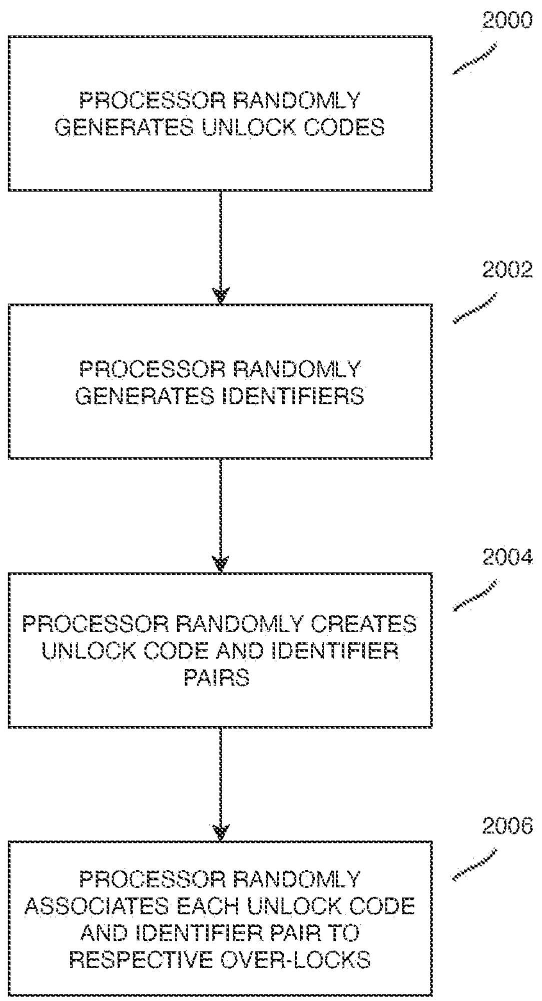
FIG. 20 is a flowchart illustrating the steps of randomly generating unlock codes and identifiers, and randomly creating unlock code/identifier pairs, according to an embodiment of the invention.

FIG. 20 is a flowchart illustrating the steps of randomly generating unlock codes and identifiers, and randomly creating unlock code/identifier pairs, according to an embodiment of the invention. In step 2000, the computing device randomly generates a plurality of unlock codes. In step 2002, the computing device randomly generates a plurality of identifiers. The generation of the random unlock codes and identifiers can occur in a step-wise manner (i.e., the unlock codes are first generated, and then the identifiers are generated, or vice-versa). In another embodiment, the generation of the random unlock codes and identifiers can occur in a staggered manner (i.e., a fixed or random number of unlock codes are generated, and then a fixed or random number of identifiers are generated, or vice-versa), until a predetermined number of unlock codes and identifiers are generated.

In an embodiment, the unlock codes and identifiers are randomly generated using a random number generator, function, or algorithm stored on the computing device and executed by software. The software can include, for example, software for the lock management system or the property management system, or a standalone software plug-in, application, or code.

In another embodiment, the unlock codes and identifiers are randomly generated using a manual process, and not generated using the computing device.

The computing device can be, for example, the computing hardware and software 119, the processing unit 120, a cloud-based system, a server, or a distributed server environment, such as that provided by Amazon Web Services® or the like.

In an embodiment, once the random unlock codes and identifiers are generated, they can be temporarily stored in a buffer, database, table, matrix, ledger, random access memory, volatile memory, or the like.

Next, in step 2004, the computing device randomly creates pairs of unlock codes and identifiers, or unlock code/identifier pairs, by randomly selecting an unlock code from the plurality of unlock codes and randomly selecting an identifier from the plurality of identifiers. In an embodiment, the computing device uses a random link generator, function, or algorithm stored on the computing device and executed by software to create the unlock code/identifier pairs. The software can include, for example, software for the lock management system or the property management system, or a standalone software plug-in, application, or code.

In another embodiment, the unlock codes and identifiers are randomly paired using a manual process, and not associated using the computing device.

In step 2006, each unlock code/identifier pair is associated with an over-lock. In an embodiment, the computing device randomly associates each unlock code/identifier pair to an over-lock. In another embodiment, each unlock code/identifier pair is randomly associated with an over-lock using a manual process.

Thus, the present invention enhances the security of the overlocks utilized with the lock management system and reduces risk of comprise of the over-locks, as not only are the unlock codes and identifiers are randomly generated, but these randomly generated values are then randomly paired, and randomly associated with respective over-locks.

Figure 21:
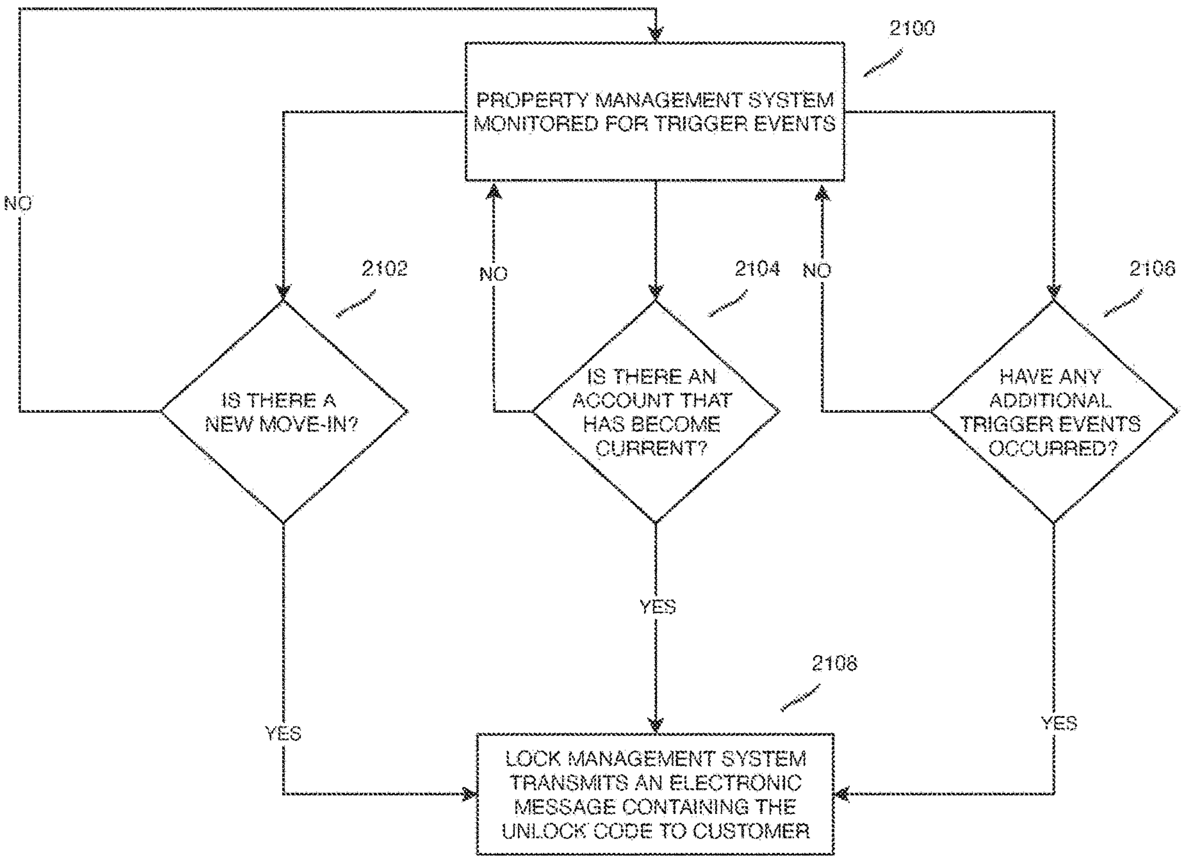
FIG. 21 is a flowchart illustrating the steps of monitoring a property management system for various events which trigger the transmission of an unlock code to a customer.

FIG. 21 is a flowchart illustrating the steps of monitoring a property management system for various events which trigger the transmission of an unlock code to a customer. In step 2100, the property management system is monitored for various trigger events. In an embodiment, the lock management system monitors the property management system via an API (such as, for example, REST, SOAP COBRA, XML-RPC, GraphQL, etc.), webhooks, callbacks, data pulls, polling, a direct connection, and the like. The lock management system can monitor the property management system in real-time, such that actions are taken by the lock management system upon a trigger event occurring. In another embodiment, the lock management system periodically queries, or receives data from, the lock management system based on a pre-determined interval. The pre-determined interval can be set by a self-storage facility operator, the lock management system, or the property management system. The pre-determined interval can be, for example, one (1) second to one (1) week, and in a preferred embodiment, is thirty (30) minutes. In another embodiment, the pre-determined interval can be based on an absolute time, such as, for example, every day at 11:59 PM.

In step 2102, lock management system determines if there is a new move-in for a self-storage unit. This determination can be made in a number of ways: (1) a new customer record is created in a database associated with the property management system, and (2) an existing customer record is updated to include an additional self-storage unit.

For example, upon a new customer initiating a rental for a self-storage unit, a new customer record is created in the property management system database. A webhook can be configured to serialize the new customer record data, and send a webhook URL to the lock management system (or another server, such as a SMS webpage server configured to receive the webhook URL). In an embodiment, the webhook URL can include, for example, the customer's mobile phone number, unlock code, and self-storage unit number. The webhook URL can further include a message, such as a welcome message for the customer.

Similarly, upon an existing customer renting an additional self-storage unit, the existing customer record is updated to include the additional unit in the property management system database, and a webhook can be utilized as described above.

If, in step 2102, the lock management determines that there is a new move-in, then in step 2108, the unlock code is transmitted to the customer via an electronic message. In an embodiment, the lock management system transmits the electronic message to the customer's mobile device via text, SMS, MMS, email, or a secure message through a software application.

If, in step 2102, the lock management system determines that there is not a new move-in for a self-storage unit, then the process returns to step 2100 where the property management system continues to be monitored for trigger events.

In step 2104, the lock management system determines if a previously delinquent customer account has become current. This determination can be made in a number of ways: (1) a customer record no longer has a delinquent flag, and (2) a customer record no longer has a past due account ledger balance.

For example, upon a customer paying a past due account ledger balance, a delinquent flag is removed from the customer record in the property management system database. A webhook can be configured to detect the removal of the delinquent flag, and send a webhook URL to the lock management system (or another server, such as a SMS webpage server configured to receive the webhook URL). In an embodiment, the webhook URL can include, for example, the customer mobile number, unlock code, and self-storage unit number. The webhook URL can further include a message for the customer notifying them that they no longer have a delinquent account.

If, in step 2104, the lock management identifies a customer account that has become current, then in step 2108, the unlock code is transmitted to the customer via, an electronic message. In an embodiment, the lock management system transmits the electronic message to the customer's mobile device via text, SMS, MMS, email, or a secure message through a software application.

If, in step 2104, the lock management system determines that there no delinquent accounts have become current, then the process returns to step 2100 where the property management system continues to be monitored for trigger events.

In step 2106, the lock management system determines if any additional trigger events have occurred. In an embodiment, additional trigger events can be customized by the self-storage manager or operator. For example, additional trigger events can include, but are not limited to: (1) an authorized user is added to an existing self-storage unit rental, (2) a new lock is applied to the self-storage unit (i.e., in the event an existing lock is damaged or no longer functioning, or the existing lock needs to be replaced), and (3) a customer requests an unlock code.

In an embodiment, if a customer adds an authorized user, such as a family member, co-worker, employee, colleague, contractor, or the like, the customer record is updated to include the authorized user. A webhook can be configured to serialize the authorized user data, and send a webhook URL that includes the authorized user's mobile device number, the unlock code, and the self-storage unit number.

In another embodiment, if an existing lock is damaged or no longer functioning, the customer record in the property management system database, and/or a record in the lock management database, is updated to map a new over-lock identifier to the self-storage unit or customer, and a webhook can be utilized as described above.

In yet another embodiment, if the customer requests an unlock code, then a webhook can be utilized as described above to transmit the unlock code to the customer's mobile device number.

In addition, the self-storage facility manager or operator, or a human operator at the management site, can request an unlock code to be sent to the customer.

While the use of text messaging has been described with regards to FIG. 21, in another embodiment, the electronic message containing the unlock code can be a voice message or voice call made to the customer's mobile device. For example, the voice message can be an automated digitized message that includes the unlock code and the self-storage unit number.

Figure 22:
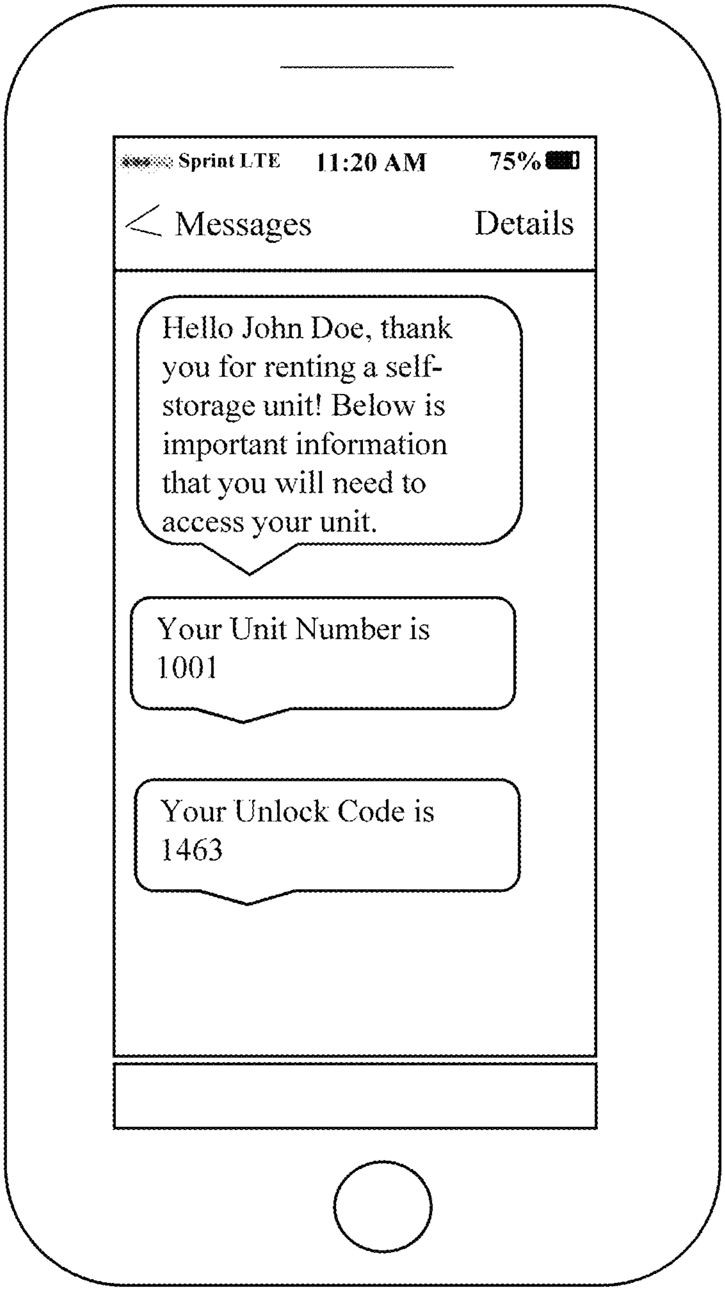
FIG. 22 is an illustration of an electronic message transmitted to a customer's mobile device.

FIG. 22 is an illustration of an electronic message transmitted to a customer's mobile device. In an embodiment, the customer receives a text message containing the self-storage unit number and an unlock code for an over-lock associated with the self-storage unit number and/or the customer. In another embodiment, the electronic message can include an over-lock identifier, such as a serial number. The electronic message can further include additional information, such as contact information for the self-storage facility, a customer service phone number or email address, turn-by-turn directions, a hyperlink to a map that provides instructions (i.e., a link to Apple Maps, Google Maps, or the like), the customer's account ledger balance, and any other information such as hours of operation or permittable access, additional rules, and safety information.

In an embodiment, the unlock code can be a temporary unlock which expires after a pre-determined period of time, or a one-time-use unlock code. In these embodiments, the over-lock is replaced by the self-storage facility manager or operator after the pre-determined period of time has passed, or once the over-lock has been opened using the temporary unlock code.

While the principles of the disclosure have been illustrated in relation to the exemplary embodiments shown herein, the principles of the disclosure are not limited thereto and include any modification, variation, or permutation thereof.

The invention claimed is:

1. A method, comprising:

establishing a customer account for a customer, wherein the customer account is paid in full and is in good standing;

associating an unlock code with a lock in a database, wherein the lock is not capable of electronic communication;

associating the customer account with the unlock code;

at a time after the customer account is paid in full and is in good standing, receiving a request for the unlock code over a network;

determining whether the customer account associated with the unlock code has a balance due;

upon the customer account having a balance due, determining after an interval whether the customer account no longer has a balance due; and upon the customer account no longer having a balance due, transmitting the unlock code over the network in response to the request.

2. A method for retrieving an unlock code for a lock, wherein the lock is not capable of electronic communication, comprising:

associating a credential with a customer account for a customer, wherein the customer account is paid in full and is in good standing;

determining whether the customer account has a balance due;

upon the customer account having a balance due, determining after an interval whether the customer account no longer has a balance due;

receiving, by a lock management system portal, a request for an unlock code and the credential associated with the customer account;

determining whether the credential is valid; and upon the customer account no longer having a balance due and the credential being valid, transmitting the unlock code over a network in response to the request.

* * * * *